US009473746B2

(12) United States Patent
Masuura et al.

(10) Patent No.: US 9,473,746 B2
(45) Date of Patent: Oct. 18, 2016

(54) IMAGE PROCESSING DEVICE, IMAGE PROCESSING METHOD, AND PROGRAM FOR OBSTRUCTION DETECTION

(71) Applicant: Sony Corporation, Tokyo (JP)

(72) Inventors: Takeshi Masuura, Kanagawa (JP); Naoki Kuzuya, Tokyo (JP); Hironaga Sano, Kanagawa (JP); Sho Ogura, Kanagawa (JP)

(73) Assignee: Sony Corporation, Tokyo (JP)

( * ) Notice: Subject to any disclaimer, the term of this patent is extended or adjusted under 35 U.S.C. 154(b) by 100 days.

(21) Appl. No.: 14/197,238

(22) Filed: Mar. 5, 2014

(65) Prior Publication Data

US 2014/0267821 A1    Sep. 18, 2014

(30) Foreign Application Priority Data

Mar. 13, 2013   (JP) .................................. 2013-050697

(51) Int. Cl.
*H04N 5/232* (2006.01)
*H04N 7/18* (2006.01)
*G08B 13/196* (2006.01)
*H04N 5/14* (2006.01)

(52) U.S. Cl.
CPC .......... *H04N 7/18* (2013.01); *G08B 13/19604* (2013.01); *H04N 5/232* (2013.01); *H04N 5/23254* (2013.01); *H04N 7/181* (2013.01); *H04N 5/144* (2013.01); *H04N 5/145* (2013.01)

(58) Field of Classification Search
CPC .. H04N 5/144; H04N 5/145; H04N 5/23254; H04N 7/18
See application file for complete search history.

(56) References Cited

U.S. PATENT DOCUMENTS

| 2010/0053321 | A1* | 3/2010 | Kim | H04N 5/144 348/135 |
| 2011/0229030 | A1* | 9/2011 | Ogura | G06T 7/001 382/170 |
| 2012/0002864 | A1 | 1/2012 | Kouno | |
| 2012/0133781 | A1* | 5/2012 | Wang | G06T 7/001 348/207.1 |
| 2012/0155764 | A1* | 6/2012 | Ogura | G06T 7/2053 382/171 |
| 2013/0101043 | A1 | 4/2013 | Miyahara et al. | |

OTHER PUBLICATIONS

U.S. Appl. No. 13/161,620, filed Jun. 16, 2011, Kouno.
U.S. Appl. No. 13/654,006, filed Oct. 17, 2012, Miyahara et al.

* cited by examiner

*Primary Examiner* — Abdelaaziz Tissire
(74) *Attorney, Agent, or Firm* — Wolf, Greenfield & Sacks, P.C.

(57) ABSTRACT

An image processing device includes: an acquisition section configured to acquire image data of a captured image; a dividing section configured to divide the acquired image data into divisional regions; a characteristic-amount calculation section configured to calculate a characteristic amount of the image data in each of the divisional regions; a characteristic-amount storage section configured to update the calculated characteristic amount and store the updated characteristic amount sequentially; and a change determination section configured to perform first and second processings, the first processing being provided to calculate a change amount or an agreement amount between the characteristic amounts, the second processing being provided to calculate a difference value between the characteristic amounts, and the change determination section being configured to determine, based on processing contents of the first and second processings, whether or not the update region is a changed region.

6 Claims, 14 Drawing Sheets t FRAME t+n FRAME

COMPARISON
RESULT

IMAGE PROCESSING DEVICE, IMAGE PROCESSING METHOD, AND PROGRAM FOR OBSTRUCTION DETECTION

CROSS REFERENCE TO RELATED APPLICATIONS

This application claims the benefit of Japanese Priority Patent Application JP2013-50697 filed Mar. 13, 2013, the entire contents of which are incorporated herein by reference.

BACKGROUND

The present disclosure relates to an image processing device, an image processing method, and a program, and, in particular, to a technology of improving precision of detecting obstructive behavior to a monitoring camera.

There has been known a monitoring system in which, in order to find an intruder such as a person and an animal into a predetermined space, an image of space monitored by a monitoring camera is captured, and the intruder is detected based on the captured image. Such a monitoring system is prevented from monitoring when an original direction of the monitoring camera is changed by obstructive behavior. Therefore, it has been proposed to compute a difference between a luminance value of a current image captured by a monitoring camera and a luminance value of a reference image stored beforehand, and to determine that obstructive behavior has occurred when the difference value is equal to or larger than a given value (for example, see Japanese Unexamined Patent Application Publication No. 2008-77517 (JP 2008-77517A)).

However, in a technique disclosed in JP 2008-77517A, among images inputted by the monitoring camera frame by frame, for example, an image obtained every other frame may be stored as a reference image and updated sequentially. When no obstructive behavior has occurred and a subject in the captured image does not move, a temporally-previous background image and a temporally-subsequent background image are substantially the same. Therefore, the difference between the luminance values in these images is also small.

In contrast, when the direction of the monitoring camera is changed by obstructive behavior, the temporally-previous background image and the temporally-subsequent background image are different. Therefore, the difference between the luminance value of the current image and that of the reference image is large. For this reason, when the difference between the luminance value of the current image and that of the reference image is large, it is determined that obstructive behavior has occurred. The difference between the luminance values may be calculated for the entire image, but is typically calculated for each of a plurality of divisional regions obtained by dividing a region of an image into a predetermined number of regions in many cases.

SUMMARY

However, in the technique of determining that obstructive behavior has occurred when the difference between the luminance value of the current image and that of the reference image is large, there may be a case in which, depending on a subject that appears in a captured image, it is falsely determined that obstructive behavior has occurred, even if no obstructive behavior has occurred. For example, in a region around an entrance through which people frequently enter and exit, the difference between the luminance value of the current image and that of the reference image may be large, and therefore, such false detection that obstructive behavior has occurred may take place. In addition, even if obstructive behavior has occurred, when the number of divisional regions where the luminance values have not much changed is larger than the number of divisional regions where the luminance values have greatly changed by the obstructive behavior, it may be falsely determined that no obstructive behavior has occurred.

It is desirable to increase precision of detecting obstructive behavior.

According to an embodiment of the present disclosure, there is provided an image processing device including an acquisition section, a dividing section, a characteristic-amount calculation section, a characteristic-amount storage section, and a change determination section. A configuration and a function of each of the sections are as follows. The acquisition section is configured to acquire image data of a captured image. The dividing section is configured to divide the acquired image data into a plurality of divisional regions. The characteristic-amount calculation section is configured to calculate a characteristic amount of the image data in each of the divisional regions. The characteristic-amount storage section is configured to update the calculated characteristic amount sequentially, and to store the updated characteristic amount sequentially. The change determination section is configured to perform first processing and second processing, the first processing being provided to calculate a change amount or an agreement amount between the characteristic amount calculated in an update region that is the divisional region in which the characteristic amount is calculated, and the characteristic amount calculated in the divisional region different from the update region in a time direction and/or a two-dimensional coordinate direction, the second processing being provided to calculate a difference value between the characteristic amount calculated currently in the update region, and the characteristic amount calculated earlier in the update region, and the change determination section being configured to determine, based on processing content of the first processing and processing content of the second processing, whether or not the update region is a changed region where a change from image data acquired earlier in the update region is large.

According to an embodiment of the present disclosure, there is provided an image processing method in which processing is performed as follows. First, image data of a captured image is acquired. Subsequently, the acquired image data is divided into a plurality of divisional regions. Subsequently, a characteristic amount of the image data in each of the divisional regions is calculated. Subsequently, first processing and second processing are performed. In the first processing, there is calculated a change amount or an agreement amount between the characteristic amount calculated in an update region that is the divisional region in which the characteristic amount is calculated, and the characteristic amount calculated in the divisional region different from the update region in a time direction and/or a two-dimensional coordinate direction. In the second processing, there is calculated a difference value between the characteristic amount calculated currently in the update region, and the characteristic amount calculated earlier in the update region. Further, based on processing content of the first processing and processing content of the second processing, whether or not the update region is a changed region where a change from image data acquired earlier in the update region is large is determined.

According to an embodiment of the present disclosure, there is provided a non-transitory tangible recording medium having a program embodied therein, the computer-readable program allowing, when executed by a computer, the computer to implement an image processing method as follows. First, image data of a captured image is acquired. Subsequently, the acquired image data is divided into a plurality of divisional regions. Subsequently, a characteristic amount of the image data in each of the divisional regions is calculated. Subsequently, first processing and second processing are performed. In the first processing, there is calculated a change amount or an agreement amount between the characteristic amount calculated in an update region that is the divisional region in which the characteristic amount is calculated, and the characteristic amount calculated in the divisional region different from the update region in a time direction and/or a two-dimensional coordinate direction. In the second processing, there is calculated a difference value between the characteristic amount calculated currently in the update region, and the characteristic amount calculated earlier in the update region. Further, based on processing content of the first processing and processing content of the second processing, whether or not the update region is a changed region where a change from image data acquired earlier in the update region is large is determined.

By configuring the image processing device and performing the image processing as described above, whether or not the update region is the changed region is determined, based on information on the difference between the characteristic amounts of the divisional regions that are different in the time direction and/or the two-dimensional coordinate direction. This allows optimum determination to be performed, for each of the divisional regions, according to the level of the change amount between the characteristic amount of the image acquired in the divisional region and that in the past.

According to the image processing device, the image processing method, and the program, of the above-described embodiments of the present disclosure, there is an improvement in precision of determining whether or not the divisional region is the changed region where a change from the past is large. Therefore, precision of detecting obstructive behavior also improves.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to describe the principles of the technology.

FIG. 12A is the graph presenting the transition of the change amount, and FIG. 12B is the graph presenting transition of a parameter indicating a tendency of a change in the change amount from the past.

FIG. 13A is the graph presenting the transition of the change amount, and FIG. 13B is the graph presenting transition of a parameter indicating a tendency of a change in the change amount from the past.

DETAILED DESCRIPTION

Figure 1:
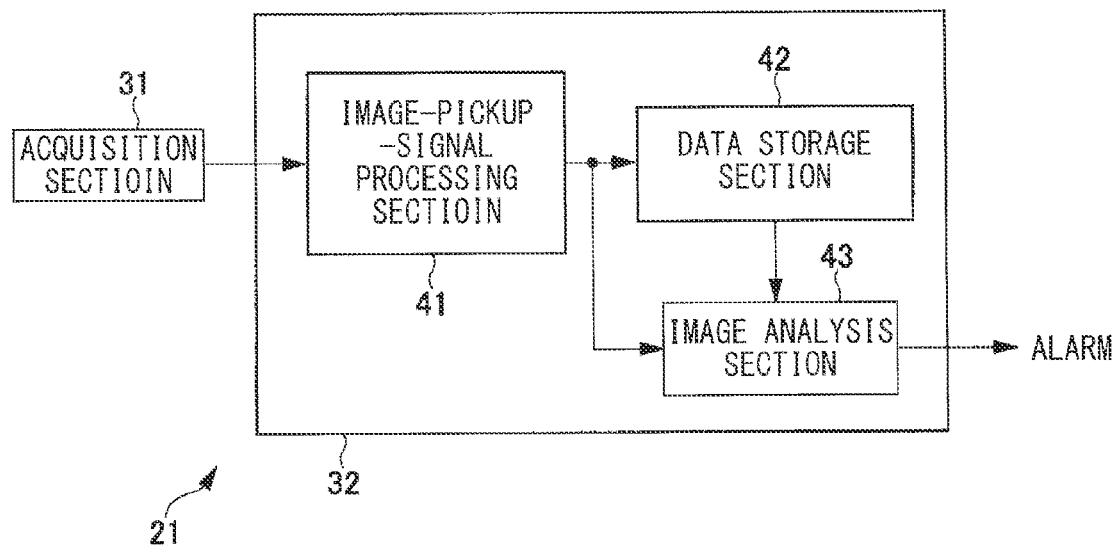
FIG. 1 is a block diagram illustrating a configuration of an embodiment of an image processing device according to a first embodiment example of the present disclosure.

Examples of an image processing device, an image processing method, and a program according to some embodiments of the present disclosure will be described in the following order, with reference to the drawings.
1. First embodiment example (an example (1) in which false detection of obstructive behavior due to an influence of a moving body is reduced)
2. Second embodiment example (an example (2) in which false detection of obstructive behavior due to an influence of a moving body is reduced)
3. Third embodiment example (an example in which precision of detecting obstructive behavior is improved in an environment where a similarity degree between images before and after obstructive behavior is high)
4. Various modifications 1. First Embodiment Example Overall Configuration Example of Image Processing Device FIG. 1 is a block diagram illustrating an overall configuration example of an image processing device according to an embodiment of the present disclosure. This configuration is common to first to third embodiment examples to be described below. An image processing device 21 detects obstructive behavior to a monitoring camera based on an acquired image, and outputs an alarm when detecting obstruction. The image processing device 21 is configured of an acquisition section 31 and an image processing section 32.

The acquisition section 31 includes an image pickup section built therein such as a video camera. The acquisition section 31 acquires image data obtained by capturing, by the image pickup section, an image of a subject such as a monitored space, and outputs the acquired image data. It is to be noted that the acquisition section 31 may be configured without having the image pickup section. In this case, the acquisition section 31 acquires image data supplied from outside through a network. The image processing section 32 is configured of an image-pickup-signal processing section 41, a data storage section 42, and an image analysis section 43.

The image-pickup-signal processing section 41 performs various kinds of image processing such as black-level correction processing, white balance processing, gamma correction processing, and color correction processing, on the image data obtained from the acquisition section 31. The image-pickup-signal processing section 41 may be configured of, for example, a DSP (Digital Signal Processor). The data storage section 42 stores the image data that has been subjected to the processing by the image-pickup-signal processing section 41. The data storage section 42 may be configured of, for example, RAM (Random Access Memory). The image analysis section 43 detects obstructive behavior by analyzing a current image supplied from the image-pickup-signal processing section 41, and a reference image that is a past image supplied from the data storage section 42. The image analysis section 43 may be configured of, for example, a CPU (Central Processing Unit).

[Principle of Obstruction Detection]

Next, a principle (a summary) of obstructive behavior detection performed by the image processing device 21 will be described with reference to FIG. 2. In an embodiment of the present disclosure, a past image PI and a current image NI are inputted to a changed-region detection section 51. The changed-region detection section 51 divides each of the past image PI and the current image NI into divisional regions each having a predetermined size. Then, a histogram of pixel values is computed for each divisional region. An amount of similarity between the histogram of the divisional region at a predetermined position in the past image PI and the histogram of the divisional region at the corresponding position in the current image NI is computed. The divisional region where the amount of similarity is small, namely, the region where a change amount is large, is detected as a changed region VI.

When the number of the changed regions VI is large, an obstruction determination section 52 determines that obstructive behavior has occurred, and then outputs an alarm. It is to be noted that, in the present embodiment example, the obstruction determination section 52 has been described using an example in which an alarm is outputted, but is not limited thereto. Instead of the alarm, the obstruction determination section 52 may output information used to distinguish contents of detected obstructive behavior. Conceivable examples of the contents of the obstructive behavior may include covering the image pickup section or the external monitoring camera with something such as a cloth, and changing a direction of the image pickup section or the external monitoring camera intentionally.

[Detailed Configuration of Image Analysis Section]

Figure 3:
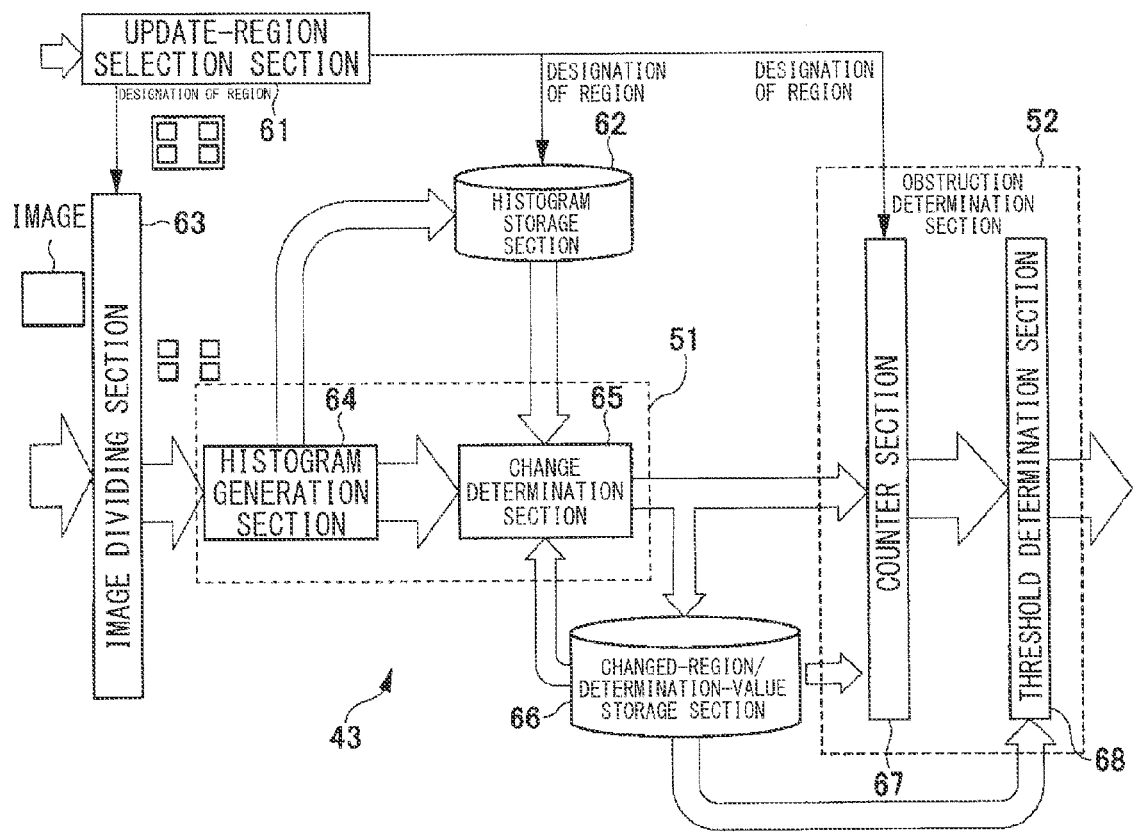
FIG. 3 is a block diagram illustrating a functional configuration of an image analysis section according to the first embodiment example of the present disclosure.

FIG. 3 is a block diagram illustrating a detailed configuration example of the image analysis section 43. The image analysis section 43 is configured of an update-region selection section 61, a histogram storage section 62, an image dividing section 63, a histogram generation section 64, a change determination section 65, a changed-region/determination-value storage section 66, a counter section 67, and a threshold determination section 68.

Figure 2:
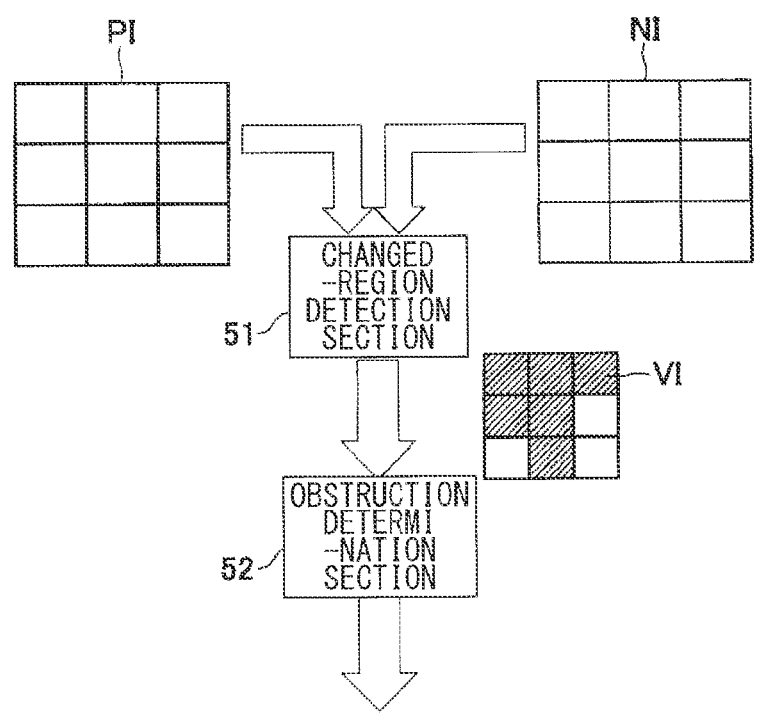
FIG. 2 is a diagram used to describe a principle of changed-region detection according to the first embodiment example of the present disclosure.

It is to be noted that the histogram generation section 64 and the change determination section 65 of FIG. 3 correspond to the changed-region detection section 51 of FIG. 2. Further, the counter section 67 and the threshold determination section 68 of FIG. 3 correspond to the obstruction determination section 52 of FIG. 2. Furthermore, the histogram storage section 62 of FIG. 3 corresponds to the data storage section 42 of FIG. 1. All or a part of the configuration illustrated in FIG. 3 is allowed to be provided in the image-pickup-signal processing section 41 or the data storage section 42 of FIG. 1, instead of being provided in the image analysis section 43.

Each time image data of a new image is acquired, the update-region selection section 61 sequentially designates M-number of (N≥M>1) divisional regions among N-number of (N>1) divisional regions, as divisional regions to be subjected to update of the reference images thereof stored in the past. The divisional region to be subjected to update of the reference image thereof stored in the past will be hereinafter referred to as "update region".

From the data supplied by the image-pickup-signal processing section 41, the update-region selection section 61 extracts frame numbers of an image acquired by the acquisition section 31, and determines the frame number of a frame to be updated. Further, the update-region selection section 61 determines the divisional regions to be updated in the frame to be updated.

Any value appropriate to a scene or the like to be monitored may be set as the value of each of "N" and "M". When the value of "N" is, for example, "64" and the value of "M" is, for example, "4", four divisional regions among sixty four divisional regions may be typically selected. The positions of the M-number of divisional regions to be updated are made to vary for every frame. Details of the selection of the update regions by the update-region selection section 61 will be described later, with reference to FIG. 4 and FIG. 5.

The image dividing section 63 divides, among the images of the respective frames based on the image data supplied from the image-pickup-signal processing section 41, the frame designated by the update-region selection section 61 into the M-number of divisional regions. The image dividing section 63 also supplies the histogram generation section 64 with the image data of the M-number of divisional regions designated by the update-region selection section 61.

The histogram generation section 64 serves as a characteristic-amount calculation section, and generates the histogram of the divisional region supplied from the image dividing section 63. It is to be noted that the image-pickup-signal processing section 41 may have a histogram generation function in some cases. In that case, the histogram generation section 64 may be provided in the image-pickup-signal processing section 41.

The histogram storage section 62 serves as a characteristic-amount storage section, and updates the histogram of the divisional region designated as the update region by the update-region selection section 61. In other words, using the histogram of the update region of the current frame supplied from the histogram generation section 64, the histogram storage section 62 performs processing of rewriting the histogram of the corresponding divisional region of the past frame that has been already stored as the reference image.

The change determination section 65 determines whether or not the image of the divisional region designated as the update region has changed, as compared with the image of the corresponding divisional region of the past frame that has been already stored as the reference image. The determination of whether the change is present or not is performed based on the level of a change amount between the histogram of the update region of the current frame supplied from the histogram generation section 64 and the histogram of the corresponding divisional region of the past frame supplied from the histogram storage section 62. The change amount is calculated by determining, when the histogram of the current frame and the histogram of the past frame to be compared to each other are overlapped, the number of pixels distributed in a part where there is no overlap.

The level of the change amount is determined based on whether or not the calculated change amount is larger than a predetermined change determination threshold Cth. The change determination threshold Cth is stored in the changed-region/determination-value storage section 66 to be described later, and read from the changed-region/determination-value storage section 66 each time change determination processing is performed. The change determination threshold Cth is expressed by the number of pixels each having a pixel value, calculated as the histogram. The method of calculating the change amount will be described later with reference to FIG. 6 to FIG. 10C.

In the present embodiment example, the change determination threshold Cth is allowed to be different for each divisional region. The change determination threshold Cth is altered, based on information on a change in a time direction, of the amount of similarity calculated in each divisional region. A method of altering the change determination threshold Cth based on the information on the change in the change amount in the time direction will be described later in detail, with reference to FIG. 11 to FIG. 13B.

Further, in the present embodiment example, an obstruction determination threshold Oth is also allowed to be altered based on the information on the change in the change amount in the time direction calculated for each divisional region. The obstruction determination threshold Oth is a threshold used in determining whether or not obstructive behavior has occurred. The obstruction determination threshold Oth is set in the threshold determination section 68 to be described later.

The changed-region/determination-value storage section 66 stores a determination result obtained by the change determination section 65. As the determination result, information on the presence or absence of a change in the update region of the current frame, with respect to the image in the past frame, is stored. The change determination threshold Cth is also stored as the determination result. Each time the image data of a new image is acquired, the information on the presence or absence of the change in the update region of the image is stored sequentially in the changed-region/determination-value storage section 66.

Each of the change determination threshold Cth and the obstruction determination threshold Oth is stored each time the value thereof is altered. In other words, the threshold stored till then is updated to a new value resulting from the alteration. When the obstruction determination threshold Oth is altered, the obstruction determination threshold Oth after the alteration is supplied to the threshold determination section 68 to be described later.

The change determination section 65 supplies the counter section 67 with the information on the presence or absence of the change, as the determination result for the divisional region to be updated of the current frame. In addition, from the changed-region/determination-value storage section 66, the information on the presence or absence of the change in the divisional region other than the divisional region to be updated of the current frame is supplied to the counter section 67. Based on output of the change determination section 65 and output of the changed-region/determination-value storage section 66, the counter section 67 counts the number of divisional regions where the change has occurred in one image being monitored.

The threshold determination section 68 compares the number of divisional regions counted by the counter section 67 with the obstruction determination threshold Oth. When the counted number of the divisional regions is larger than the obstruction determination threshold Oth, the threshold determination section 68 determines that obstructive behavior has been detected, and outputs a detection signal. This detection signal may be, for example, an alarm.

[Processing in Image Dividing Section and Update-Region Selection Section]

Next, an example of processing in each of the image dividing section 63 and the update-region selection section

Figure 4:
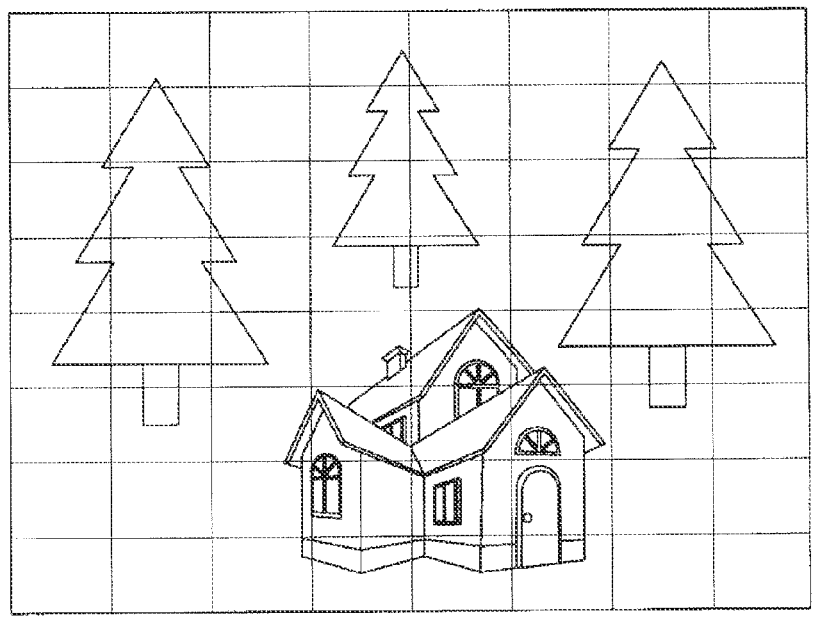
FIG. 4 is an explanatory diagram illustrating an example of division of a region according to the first embodiment example of the present disclosure.

61 illustrated in FIG. 3 will be described with reference to FIG. 4 and FIG. 5. FIG. 4 is a diagram illustrating an example of division of an image performed by the image dividing section 63. FIG. 4 illustrates a state in which an image including trees and a house is divided into divisional regions of eight by eight in a lateral direction and a vertical direction, i.e. 8×8=64 (=N).

The update-region selection section 61 selects the predetermined M-number of (four, in the present embodiment example) divisional regions, among the sixty four divisional regions. In the present embodiment example, the update-region selection section 61 (see FIG. 1) selects the M=four divisional regions, each time an image is acquired by the acquisition section 31, in other words, frame by frame. The positions of the four selected divisional regions are moved frame by frame. Therefore, when the positions of the selected divisional regions are moved in the vertical direction four times and in the lateral direction four times, i.e. sixteen times, selection of the entire region of one image is completed.

Figure 5:
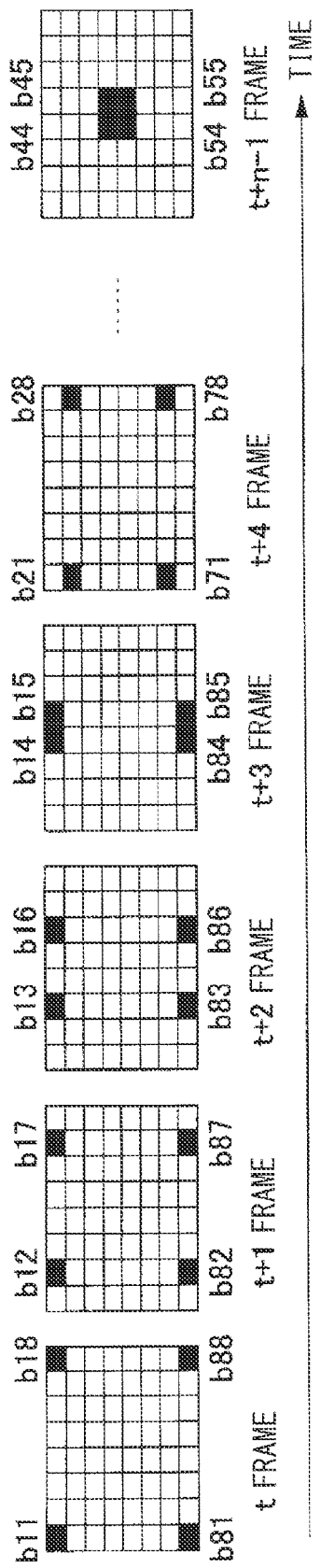
FIG. 5 is a diagram used to describe movement of an update region to be updated according to the first embodiment example of the present disclosure.

FIG. 5 is a diagram illustrating a way of selecting the update region. In FIG. 5, examples of selecting the update regions by the update-region selection section 61 are illustrated in a time series. An example of selecting the update regions in at frame which is a frame at a predetermined point in time is illustrated at a left end of FIG. 5, and an example of selecting the update regions in a t+n−1 frame is illustrated at a right end thereof.

Here, "n" refers to a value (the number of frames) indicating an interval from a time when a certain divisional region is selected as an update region to a time when this divisional region is selected again as an update region. For example, the number of frames necessary before all the divisional regions forming an image are selected may be "n". As described above, in the present embodiment example, the selection of the entire region of one image is completed when the positions of the selected update regions are moved sixteen times, in other words, this selection is completed with sixteen frames. Therefore, "n" equals 16.

The number of frames necessary before completing the selection of the entire region forming one image is changed by the number (=N) of division of a region performed by the image dividing section 63 and the number (=M) of divisional regions selected by the update-region selection section 61 as the update regions.

In the t frame, as illustrated at the left end of FIG. 5, the update-region selection section 61 selects a divisional region b11 located at a leftmost position and a divisional region b18 located at a rightmost position, in a first row. The update-region selection section 61 also selects a divisional region b81 located at a leftmost position and a divisional region b88 located at a rightmost position, in an eighth row. It is to be noted that, in FIG. 5, a divisional region located in an i-th row from the top and in a j-th column from the left is expressed as a divisional region bij. The same is applicable for each diagram to be described later.

In a t+1 frame, the update-region selection section 61 selects the following four divisional regions illustrated in a second diagram from the left in FIG. 5, as the update regions.

A divisional region b12 located immediately on the right of the divisional region b11

A divisional region b17 located immediately on the left of the divisional region b18

A divisional region b82 located immediately on the right of the divisional region b81 in the eighth row A divisional region b87 located immediately on the left of the divisional region b88 in the eighth row In a t+2 frame, the update-region selection section 61 selects the following four divisional regions illustrated in a third diagram from the left in FIG. 5, as the update regions.

A divisional region b13 located immediately on the right of the divisional region b12 in the first row A divisional region b16 located immediately on the left of the divisional region b17 in the first row A divisional region b83 located immediately on the right of the divisional region b82 in the eighth row A divisional region b86 located immediately on the left of the divisional region b87 in the eighth row In a t+3 frame, the update-region selection section 61 selects the following four divisional regions illustrated in a fourth diagram from the left in FIG. 5, as the update regions.

A divisional region b14 located immediately on the right of the divisional region b13 in the first row A divisional region b15 located immediately on the left of the divisional region b16 in the first row A divisional region b84 located immediately on the right of the divisional region b83 in the eighth row A divisional region b85 located immediately on the left of the divisional region b86 in the eighth row When the selection and movement of the divisional regions in the lateral direction from the top row to the bottom row are thus completed, a second row and a seventh row are selected in the next t+4 frame. In other words, the following four divisional regions illustrated in a fifth diagram from the left in FIG. 5 are selected as the update regions.

A divisional region b21 located at a leftmost position in the second row

A divisional region b28 located at a rightmost position in the second row

A divisional region b71 located at a leftmost position in the seventh row

A divisional region b78 located at a rightmost position in the seventh row

In a t+5 frame, the update-region selection section 61 selects the following four divisional regions illustrated in a sixth diagram from the left in FIG. 5, as the update regions.

A divisional region b22 located immediately on the right of the divisional region b21 in the second row A divisional region b27 located immediately on the left of the divisional region b28 in the second row A divisional region b72 located immediately on the right of the divisional region b71 in the seventh row A divisional region b77 located immediately on the left of the divisional region b78 in the seventh row Afterwards, four divisional regions are selected sequentially as the update regions in one frame by a similar procedure. In other words, in an upper half of a left half region, selection in a row proceeds from the left to the right, and the row is sequentially selected from the top to the bottom. In an upper half of a right half region, selection in a row proceeds from the right to the left, and the row is sequentially selected from the top to the bottom. In a lower half of the left half region, selection in a row proceeds from the left to the right, and the row is sequentially selected from the bottom to the top. In a lower half of the right half region, selection in a row proceeds from the left to the right, and the row is sequentially selected from the bottom to the top.

In an image of the t+n−1 frame illustrated at a rightmost position in FIG. 5, the following four divisional regions are selected as the update regions.

A divisional region b44 in a fourth row
A divisional region b45 in the fourth row
A divisional region b54 in a fifth row
A divisional region b55 in the fifth row In a t+n frame following the above-described selection of all the divisional regions forming the image, the four divisional regions at the positions illustrated in the leftmost diagram of FIG. 5 are selected again as the update regions. In other words, the divisional region b11, the divisional region b18, the divisional region b81, and the divisional region b88 are selected.

Each time the update region is selected by the update-region selection section 61, the histogram of the update region is generated by the histogram generation section 64 as described above. The generated histogram is stored in the histogram storage section 62. According to the present embodiment example, not the image data such as pixel values, but the histogram is stored. Therefore, as compared with a case in which image data itself is stored, storage capacity of the storage section that stores data is reduced, which allows a reduction in cost.

It is to be noted that, in the present embodiment example, the example, in which the value of "n" is the number of frames necessary before the completion of the selection of all the divisional regions forming the image, has been used, but the present embodiment example is not limited thereto. The number of frames for the completion of the selection of all the divisional regions, plus x-number of frames, may be "n" of the n-number of frames. During these x-number of frames, selection of update regions is not performed.

In a case of x=10, 16 frames for the completion of the selection of all the divisional regions+10 frames=26 frames is the n-number of frames. This extends the period before a predetermined update region is next selected again as the update region, by 10 frames. If the period of the n-number of frames is extended, a cycle of performing determination of a changed region is also extended. Thus extending the cycle of determining the changed region may be effective, for example, in a case in which it is desirable to detect obstructive behavior slowly by taking time.

[Detailed Configuration of Change Determination Section]

Figure 6:
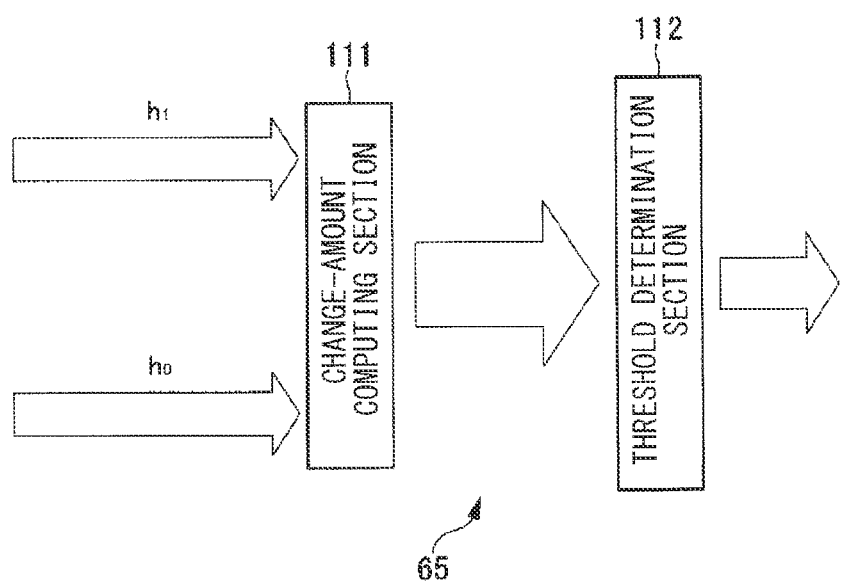
FIG. 6 is a block diagram illustrating a functional configuration of a change determination section according to the first embodiment example of the present disclosure.

FIG. 6 is a block diagram illustrating a detailed configuration example of the change determination section 65. The change determination section 65 is configured of a change-amount computing section 111 and a threshold determination section 112.

The change-amount computing section 111 computes a change amount between the histogram of the update region of the current frame supplied from the histogram generation section 64, and the histogram of the past divisional region corresponding thereto. The threshold determination section 112 compares the computed change amount with the change determination threshold Cth, and determines that there is a change in the image of the divisional region, when the change amount is larger than the change determination threshold Cth. In other words, the threshold determination section 112 determines that that divisional region is a changed region. The threshold determination section 112 outputs the information on the presence or absence of the change, to the changed-region/determination-value storage section 66 and the counter section 67 (FIG. 3), as a determination result for the change in the image of the divisional region.

[Processing of Change Determination Section]

Figure 7A:
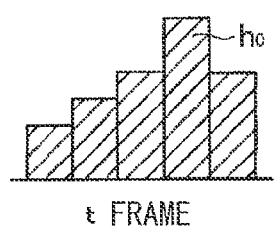
FIGS. 7A to 7C are diagrams illustrating examples of histograms when there is no change between the update region and the same region in the past, and an example of a result of a comparison between the histograms, according to the first embodiment example of the present disclosure.
Figure 7B:
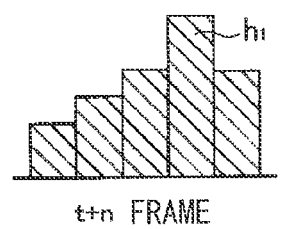
Figure 7C:
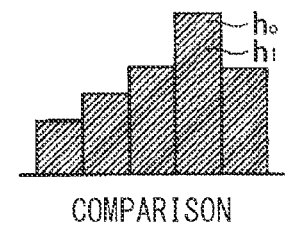

Next, a method of determining the presence or absence of a change in the image of the divisional region, which is performed by the change determination section 65, will be described with reference to FIG. 7A to FIG. 10C. FIGS. 7A and 7C illustrate an example including a histogram h0 of the t frame, and a histogram h1 of the t+n frame (n=16, in the present embodiment example) that are supplied to the change-amount computing section 111). In other words, the histogram h0 of FIG. 7A is an example of the histogram of the t frame, and the histogram h1 of FIG. 7B is an example of the histogram of the t+n frame. It is to be noted that a horizontal axis indicates pixel values represented by luminance values, and a vertical axis indicates the number of pixels having the pixel values.

First, for the histogram h0 and the histogram h1 as illustrated in FIGS. 7A and 7B, an amount of similarity is computed in the change-amount computing section 111 by the following Expression (1) using an intersection.

$$D = \Sigma \min(A_i, B_i) \quad (1)$$

Of Expression (1), "Ai" represents one pixel value of the histogram h0, and "Bi" represents one pixel value of the histogram h1. Further, "min" is a function used to obtain smaller one of two values (Ai and Bi) substituted in subsequent parentheses. Therefore, according to Expression (1), for each pixel value, the sum of smaller numeric values of pixel (pixel values) is determined.

FIG. 7C illustrates the histogram h0 and the histogram h1 overlapping each other. As illustrated in FIGS. 7A and 7B, when the histogram h0 and the histogram h1 are the same, the value D computed by Expression (1) is a large value. In contrast, when obstructive behavior has occurred, the area of an overlap between the histogram h0 and the histogram h1 in the case the histograms h0 and h1 are overlapped on each other is considerably small. In other words, the value D of Expression (1) is large when the similarity degree between the two images is high, and the value D of Expression (1) is small when this similarity degree is low.

Figure 8:
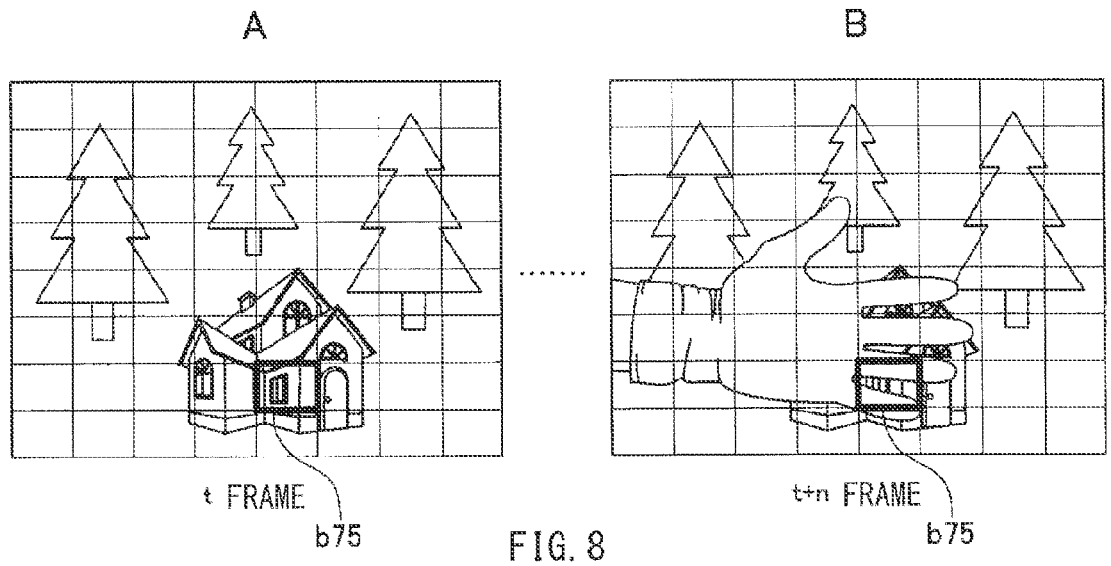
FIG. 8 is a diagram illustrating examples of captured images of the update region when obstructive behavior has occurred, according to the first embodiment example of the present disclosure.

FIG. 8 illustrates examples of captured images before and after occurrence of obstructive behavior. Part A of FIG. 8 illustrates the example of the captured image in the t frame before the occurrence of the obstructive behavior, and Part B of FIG. 8 illustrates the captured image of the t+n frame during the occurrence of the obstructive behavior. An image including trees and a house is illustrated in Part A of FIG. 8, and an image including a gloved hand of a person is illustrated in Part B of FIG. 8.

Figures 9A, 9B, 9C:
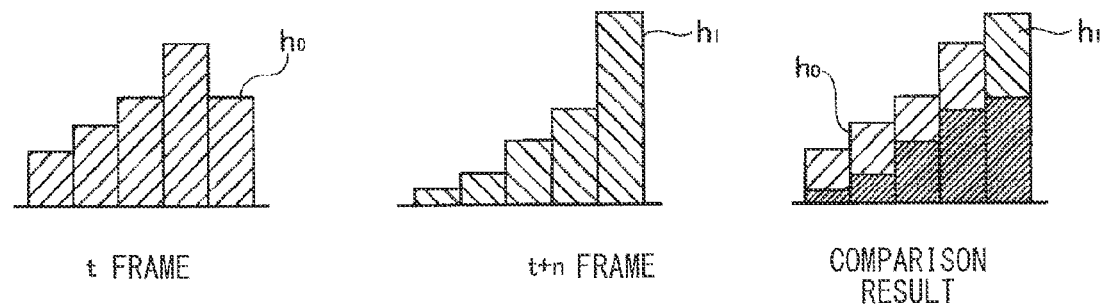
FIGS. 9A to 9C are diagrams illustrating an example of a result of a comparison between histograms when obstructive behavior has occurred, according to the first embodiment example of the present disclosure.

FIGS. 9A to 9C are diagrams illustrating examples of the histograms for a divisional region b75 which is a fifth region from the left in the seventh row from the top in each of screens illustrated in FIG. 8. FIG. 9A illustrates the histogram h0 in the t frame illustrated in Part A of FIG. 8, and FIG. 9B illustrates the histogram h1 of the t+n frame illustrated in Part B of FIG. 8. FIG. 9C is a diagram obtained by overlapping the histogram h0 illustrated in FIG. 9A and the histogram h1 illustrated in FIG. 9B. In FIG. 9C, an overlap between the histogram h0 and the histogram h1 is indicated with narrow leftward-slanting lines.

When the obstructive behavior has occurred while the image is captured as illustrated in Part B of FIG. 8, an overlap between the histogram h0 before the occurrence of the obstructive behavior and the histogram h1 after the occurrence of the obstructive behavior is small as illustrated in FIG. 9C. Therefore, the value D computed using Expression (1) described above is also small.

Figures 10A, 10B, 10C:
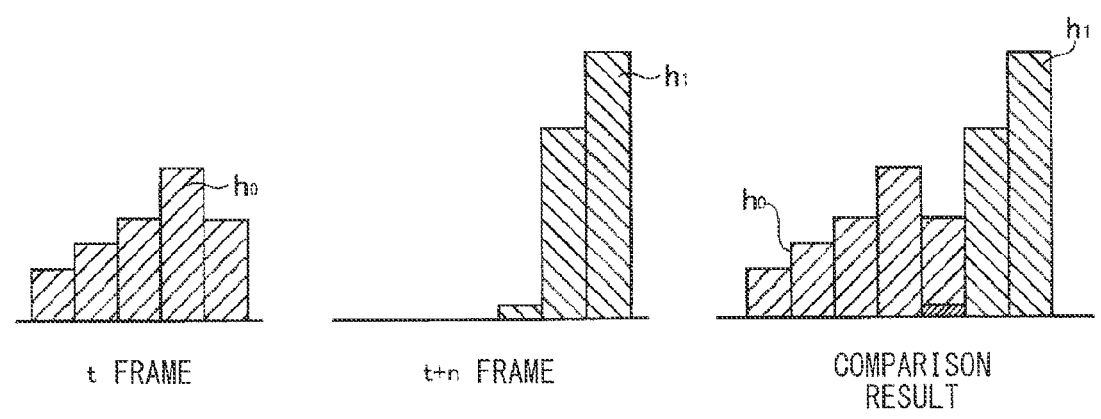
FIGS. 10A to 10C are diagrams illustrating examples of histograms when a change between the update region and the same region in the past is large, and an example of a result of a comparison between the histograms, according to the first embodiment example of the present disclosure.

FIGS. 10A to 10C are diagrams illustrating examples of the histogram h0 and the histogram h1 when the similarity degree between the image of the t frame and the image of the t+n frame is lower than that of the examples illustrated in FIGS. 9A to 9C. FIG. 10A illustrates the histogram h0 of the t frame, and FIG. 10B illustrates the histogram h1 of the t+n frame. FIG. 10C is a diagram obtained by overlapping the histogram h0 and the histogram h1.

In the histogram h0 in the t frame illustrated in FIG. 10A, distribution of pixels is seen in a relatively wide range of pixel values. In contrast, in the histogram h1 in the t+n frame, distribution of pixels is concentrated on high pixel values. When such histogram h0 and histogram h1 are overlapped, the area of the overlap therebetween is considerably small, as indicated with narrow leftward-slanting lines in FIG. 10C. Therefore, the value D of Expression (1) described above is considerably small. In the present embodiment example, a number obtained by subtracting this value D from the total pixel number of the divisional region, namely the change amount, is calculated. Then, whether or not the divisional region is a changed region is determined, based on whether or not the calculated change amount is larger than the predetermined change determination threshold Cth.

When the change amount is larger than the change determination threshold Cth set beforehand, the threshold determination section 112 determines that the divisional region (the divisional region b75 of FIG. 8) is a changed region. The smaller the value set as the change determination threshold Cth is, the higher the probability of being determined as the changed region is. In other words, the larger the value set as the change determination threshold Cth is, the lower the probability of being determined as the changed region is.

[Method of Altering Change Determination Threshold]

Typically, only on change determination threshold Cth has been set for the entire region of an image. In other words, the same change determination threshold Cth has been applied to all divisional regions forming a screen. In this technique, however, there may be a case in which, depending on a subject included in a captured image, it is falsely determined that obstructive behavior has occurred, even if no obstructive behavior has occurred.

Figure 11:
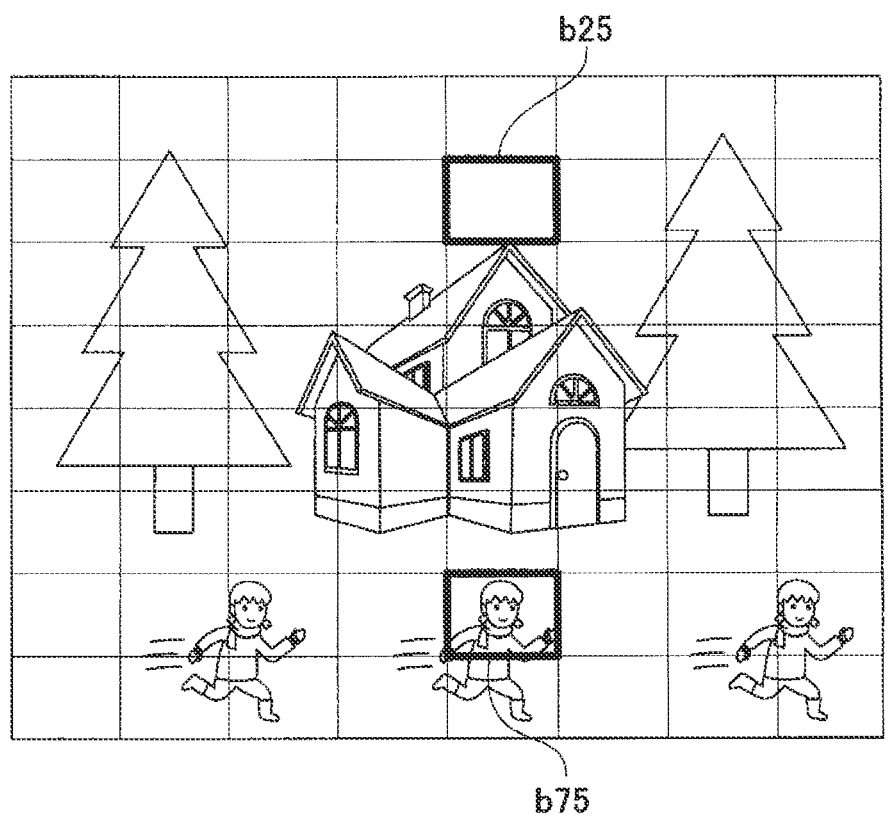
FIG. 11 is a diagram illustrating an example of a captured image having both of a region where a moving body is constantly present and a region where the moving body is absent, according to the first embodiment example of the present disclosure.

FIG. 11 is a diagram illustrating an example of a captured image, in a case in which there is a region where a moving body appears constantly within a space monitored by the image pickup section. In the captured image illustrated in FIG. 11, a house and trees are included, and a person as a moving body is also included. The person appears and disappears constantly in a region covering the first row and the second row from the bottom in the image.

For example, in the fifth divisional region b75 from the left in the seventh row from the top, the person as the moving body may be constantly captured, and therefore, there may be a large change between an image of a frame in which the person is captured and an image of a frame in which the person is not captured. On the other hand, in a fifth divisional region b25 from the left in the second row from the top of the image illustrated in FIG. 11, the moving body is not captured, and therefore, a large change between the image of the current frame and the image of the past frame is not detected.

When the number of regions (divisional regions) each determined to have a large change between images occupies most part of the screen as in the divisional region b75, the number of divisional regions counted by the counter section 67 (see FIG. 3) exceeds the obstruction determination threshold Oth. In this case, the threshold determination section 68 determines that obstructive behavior has occurred, although no obstructive behavior has actually occurred.

In the present embodiment example, in order to prevent such false determination, the value of the change determination threshold Cth is allowed to be altered based on information on a change in the change amount in the time direction. The information on the change in the change amount in the time direction refers to information calculated as a variable K, through use of, for example, the following Expression (2).

$$K = \alpha T + (1-\alpha)k \quad (2)$$

In the above Expression (2), "T" is a value obtained by subtracting the value D serving as the similarity degree determined by the above-described Expression (1), from the pixel number of the entire divisional region. In other words, "T" is a value that represents a change amount (a difference value) in image, between the histogram h1 obtained from the current frame and the histogram h0 obtained from the past frame. "T", namely a variable T, will also be hereinafter referred to as a change amount T. The greater the change between images is, the larger the variable T is.

In the above Expression (2), "α" is a parameter of a fixed value (hereinafter, also referred to as "constant parameter") that controls the value of the variable K, and, for example, a value such as 0.9 may be set. Any value larger than 0 and smaller than 1 may be set as the value of the constant parameter α. In the above Expression (2), "k" is a variable in which the value of the previously-calculated variable K is substituted, and, for example, a value such as "0" may be set as an initial value.

In other words, in the above Expression (2), alpha blending (time filter processing) is performed on the value determined earlier and the value currently determined as the change amount T between the current frame and the past frame in the update region. According to this Expression (2), a value indicating the state of a change in the time direction, of the change amount T between the current frame and the past frame in the update region, is calculated as the variable K. In other words, a value indicating a tendency of a change from a value obtained in the past (hereinafter, also referred to as "change tendency characteristic parameter") is calculated as the variable K.

For example, in a region where a moving body appears and disappears constantly like the divisional region b75 of FIG. 11, the value of the variable K increases each time divisional regions are selected as the update regions. However, the value of the variable K gradually decreases, when a state in which there is almost no change amount with respect to the past frame continues.

The above-described constant parameter α is a value that controls a decrease amount of the variable K, and the closer to 1 the value set for the constant parameter α is, the higher the decrease degree is. In other words, a rate of decrease of the variable K increases. If a value close to 0 is set as the value of the constant parameter α, the rate of decrease of the variable K decreases accordingly.

When a threshold Mth (which will be hereinafter referred to as "moving-body detection determination threshold Mth") is set beforehand for the variable K serving as the change tendency characteristic parameter, and the value of the variable K exceeds the moving-body detection determination threshold Mth, the change determination threshold Cth is altered. To be more specific, the change determination threshold Cth is altered to a larger value, to make it difficult to determine a region as a changed region.

Figure 12A:
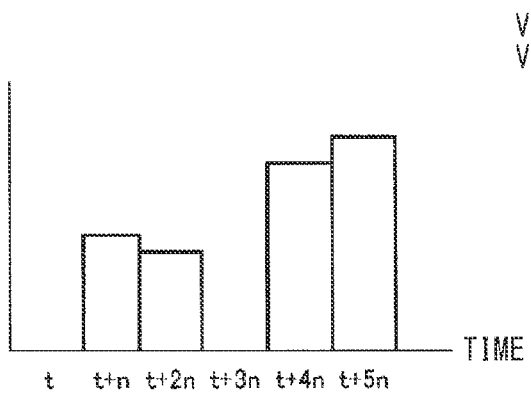
FIGS. 12A and 12B are graphs regarding transition of the change amount in the region where the moving body is constantly present, according to the first embodiment example of the present disclosure.
Figure 12B:
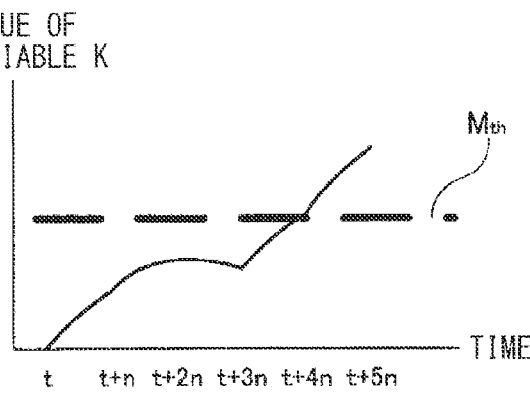

FIGS. 12A and 12B respectively illustrate an example of the change in the time direction of the change amount T in image, and an example of that of the variable K, in a region where a moving body is captured constantly. FIG. 12A is a graph presenting the example of the change in the time direction of the change amount T, and a vertical axis indicates the value of the change amount T, while a horizontal axis indicates time. FIG. 12B is a graph presenting the example of the change in the time direction of the variable K, and a vertical axis indicates the value of the variable K, while a horizontal axis indicates time. FIG. 12A and FIG. 12B present the time in common, and each illustrate the time from at frame to a t+5n frame.

For example, suppose a person has intruded in a region that is selected as the update region in the t+n frame, and has passed in the t+2n frame. Further, suppose after being absent in the selected region in the t+3n frame, the person has intruded again in the t+4n frame, and has passed in the t+5n frame. In this case, as the change amount T illustrated in FIG. 12A, a predetermined value is calculated (detected) in each of the t+n frame in which the person has appeared in the selected region, the t+2n frame in which the person has disappeared, the t+4n frame in which the person has been detected again, and the t+5n frame in which the person has disappeared.

As illustrated in FIG. 12B, the variable K calculated based on this change amount T increases in the t+n frame in which the person has been detected and the t+2n frame in which the person has disappeared. In the t+3n frame in which the person is not present, as continued from the t+2n frame, the value of the variable K decreases according to the value of the parameter α set beforehand. However, in the subsequent t+4n frame, the person is detected again, and therefore, the value of the change amount T is detected, and the variable K increases. In the next t+5n frame, the person disappears, and therefore, the value of the change amount T is detected, and the value of the variable K further increases. Subsequently, at the time of the t+5n frame, the value of the variable K exceeds the moving-body detection determination threshold Mth set beforehand.

When the value of the variable K exceeds the moving-body detection determination threshold Mth, the value of the change determination threshold Cth is altered to a larger value. This makes it possible to reduce such false determination that the region where the moving body is constantly present is a region where obstructive behavior has occurred.

Figure 13A:
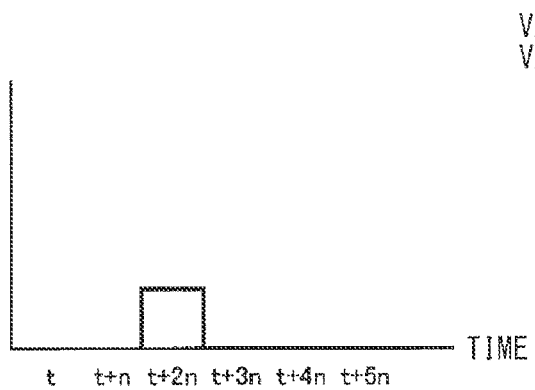
FIGS. 13A and 13B are graphs regarding transition of the change amount in the region where the moving body is constantly absent, according to the first embodiment example of the present disclosure.
Figure 13B:
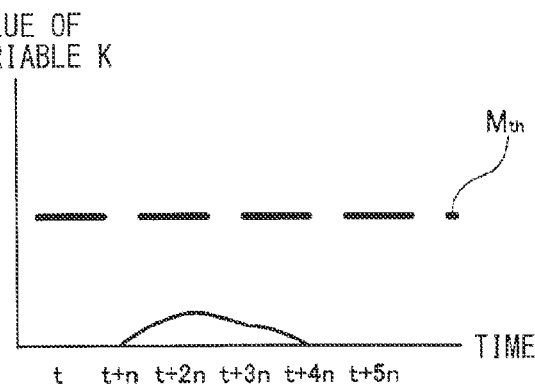

FIGS. 13A and 13B are graphs respectively presenting an example of the change in the time direction of the change amount T and an example of that of the variable K, in a case in which a region where a moving body appears constantly does not exist, in the space monitored by the image pickup section. FIG. 13A is the graph presenting the example of the change in the time direction of the change amount T, and a vertical axis indicates the value of the change amount T, while a horizontal axis indicates time. FIG. 13B is the graph presenting the example of the change in the time direction of the variable K, and a vertical axis indicates the value of the variable K, and a horizontal axis indicates time.

FIG. 13A illustrates a state in which the change amount T is detected only in the t+2n frame. Such a phenomenon may occur in a case such as a case where noise is mixed. However, an increase in the change amount T due to such noise etc. does not continue for a long time. For this reason, the value of the variable K decreases according to the value of the parameter α. As illustrated in FIG. 13B, the value of the variable K decreases after reaching a peak in the t+2n frame, and then becomes 0 in the t+4n frame.

In other words, the variable K gradually decreases according to the value of the parameter α even if the change amount T is detected due to the influence of the noise, and therefore, the value of the variable K does not exceed the moving-body detection determination threshold Mth. Hence, the value of the change determination threshold Cth is not altered due to the influence of the noise.

Further, it is conceivable that, even in a region where the moving body is constantly captured like the divisional region b75 of FIG. 11, the moving body may not be captured depending on time zone. For example, in an entrance through which people enter and exit frequently, people may not be present late in midnight time zone, and therefore, a person may not be captured. In this way, during the time zone in which a person is not captured, the change amount T is not detected, and therefore, the value of the variable K decreases due to the influence of the parameter α. It is possible to alter the change determination threshold Cth mostly to an optimum value, by returning the change determination threshold Cth to a value before the alternation, at the time when the variable K falls below the moving-body detection determination threshold Mth.

Furthermore, in a divisional region where the value of the variable K is large, if the value of the change determination threshold Cth is provided as a value larger than an upper limit of the change amount T, the divisional region is not determined as a changed region. In addition, by also altering the value of the obstruction determination threshold Oth, it is possible to eliminate possibility that a region, in which an image constantly changes due to the influence of a moving body and the like, is counted as a changed region. It is to be noted that, in altering the value of the obstruction determination threshold Oth, it is necessary to set the value of the change determination threshold Cth to the upper limit of the change amount T, or to perform processing such as "preventing the obstruction determination from reflecting a change determination result in a specific update region".

It is to be noted that, in the present embodiment example, there has been described the example in which the value of the moving-body detection determination threshold Mth is a fixed value, and the only one moving-body detection determination threshold Mth is provided, but the present embodiment example is not limited thereto. A plurality of moving-body detection determination thresholds Mth having different values may be provided. This allows the change determination threshold Cth to be set to a value corresponding to the level of the moving-body detection determination threshold Mth. In addition, the value of the change determination threshold Cth may also be set to a value proportional to the value of the variable K, instead being changed by the unit of a predetermined amount.

[Example of Obstructive Behavior Detection Processing by Image Processing Device]

Figure 14:
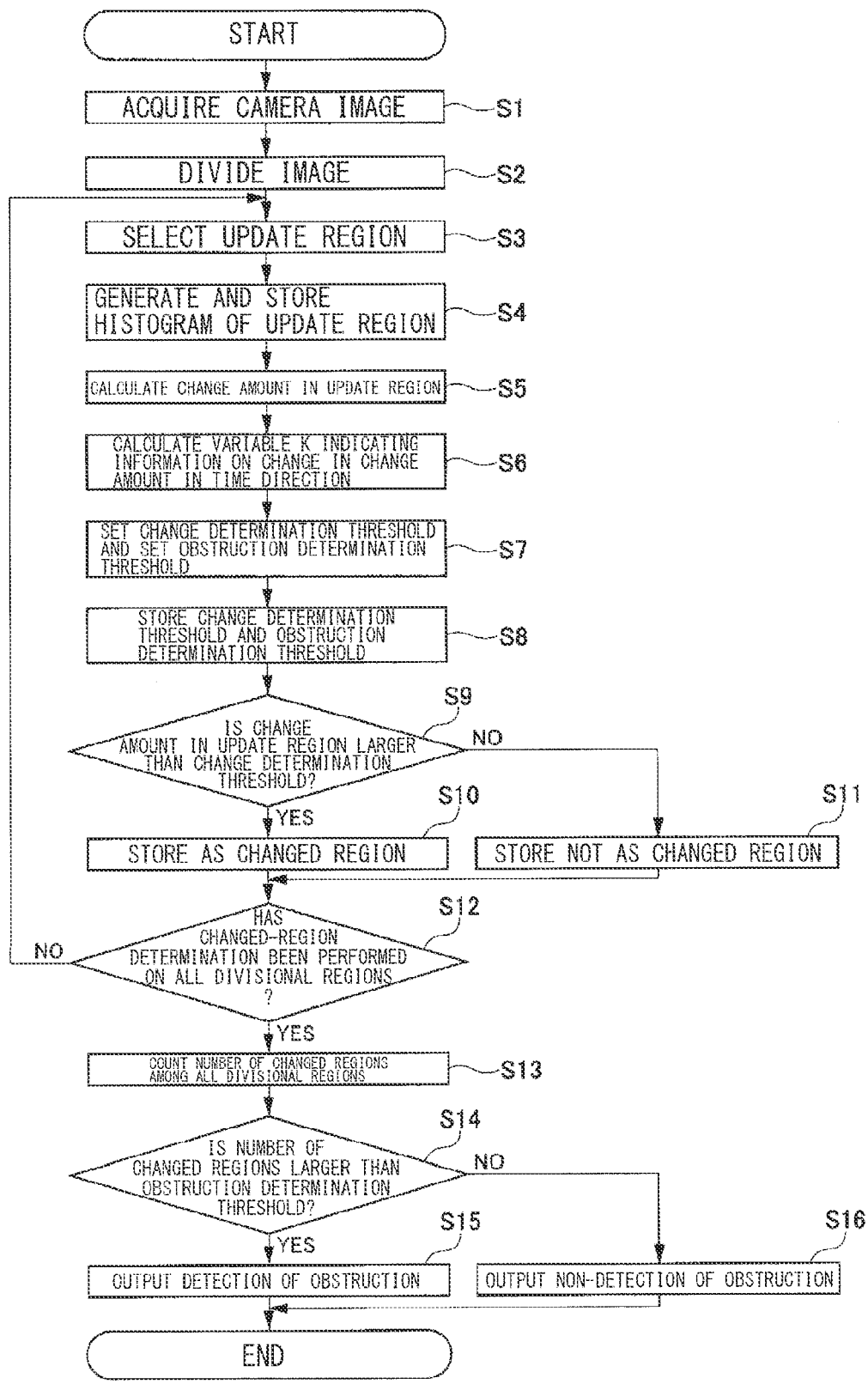
FIG. 14 is a flowchart indicating an example of obstruction determination processing, according to the first embodiment example of the present disclosure.

Next, obstructive behavior detection processing of the image processing device 21 according to the present embodiment example will be described with reference to a flowchart of FIG. 14.

First, a camera image is acquired by the acquisition section 31 (see FIG. 1). In other words, image data of a picked-up image obtained by capturing a predetermined monitored object is acquired (step S1). Next, the image dividing section 63 (see FIG. 3) divides the image data into the N-number of divisional regions (step S2). In this embodiment example, an image of each frame based on the image data is divided into sixty four (8×8=64) divisional regions.

Subsequently, in the update-region selection section 61, a predetermined divisional region is selected as an update region (step S3). In other words, of the sixty four divisional regions, the predetermined M-number of divisional regions are selected as the update regions. In this embodiment example, M is assumed to be 4.

Next, the histogram generation section 64 generates a histogram of the update region, and the generated histogram is stored in the histogram storage section 62 (step S4). Subsequently, a change amount in the update region is calculated by the change determination section 65, which is performed as second processing (step S5). In other words, the change amount T between the histogram generated based on the image of the current frame and the histogram generated based on the image of the past frame, in the update region, is calculated. For example, the change amount T between the histogram generated based on the image of the current t frame and the histogram generated based on the image of the past t–n frame may be calculated.

Subsequently, the variable K representing the information on the change in the change amount in the time direction is also calculated using the change amount T also by the change determination section 65, which is performed as first processing (step S6). Then, based on the calculated value of the variable K, the value of the change determination threshold Cth and/or the value of the obstruction determination threshold Oth is set (step S7). For example, when the variable K exceeds the moving-body detection determination threshold Mth, the change determination threshold Cth may be set to a larger value. Further, when the variable K previously exceeding the moving-body detection determination threshold Mth changes to a value less than the moving-body detection determination threshold Mth, processing of returning the change determination threshold Cth to the original value before alteration is performed. The change determination threshold Cth whose value has been altered is stored in the changed-region/determination-value storage section 66 (step S8). When the obstruction determination threshold Oth is also altered, the obstruction determination threshold Oth is also stored.

Next, it is determined whether or not the change amount T calculated in the update region also by the change determination section 65 is larger than the change determination threshold Cth (step S9). When the change amount T is larger, the update region is stored in the changed-region/determination-value storage section 66, as a changed region (step S10). When the change amount T is equal to or smaller than the change determination threshold Cth, a result indicating that the update region is not a changed region is stored in the changed-region/determination-value storage section 66 (step S11).

Then, it is determined whether or not changed-region determination has been performed for all the divisional regions forming the captured image (step S12). When there is still a divisional region for which the changed-region determination has not been performed, the processing continues by returning to step S3.

When it is determined that the changed-region determination for all the divisional regions is completed, the counter section 67 counts the number of divisional regions determined as the changed regions targeting all the divisional regions (step S13). In other words, the number of divisional regions determined as the changed regions is counted, based on determination results of the divisional regions to be updated of the current frame, supplied from the change determination section 65, and determination results of the divisional regions other than the divisional regions to be updated of the current frame, supplied from the changed-region/determination-value storage section 66.

The threshold determination section 68 then determines whether or not the number of divisional regions counted as the changed regions is larger than the obstruction determination threshold Oth (step S14). When the number of divisional regions counted as the changed regions is larger than the obstruction determination threshold Oth, such a determination result that obstructive behavior has been detected is outputted (step S15), and the processing ends. When the number of divisional regions counted as the changed regions is equal to or smaller than the obstruction determination threshold Oth, such a determination result that obstructive behavior has not been detected is outputted (step S16), and the processing ends.

According to the first embodiment example described above, when the value of the variable K exceeds the moving-body detection determination threshold Mth, the value of the change determination threshold Cth is altered to a larger value. In other words, the value of the change determination threshold Cth is altered to a value that makes it difficult to determine that the update region is a changed region. Therefore, probability of determining that the update region is a changed region is reduced. This reduces such false determination that the region where the moving body is constantly present is a region where obstructive behavior has occurred.

In addition, according to the first embodiment example described above, the value of the change determination threshold Cth used to determine whether or not the update region is a changed region is automatically altered according to the value of the variable K. To be more specific, as described above, at the time when the variable K exceeds the moving-body detection determination threshold Mth, the change determination threshold Cth is altered to a larger value. Moreover, it is also possible to set the change determination threshold Cth to be returned to a value before the alteration, at the time when the variable K becomes equal to or smaller than the moving-body detection determination threshold Mth.

By thus setting, the value of the change determination threshold Cth is automatically altered according to a captured scene and/or a time zone during which an image is captured, and using the change determination threshold Cth whose value has been updated, determination of whether or not the update region is a changed region is performed. This makes it unnecessary for a user to manually alter the change determination threshold Cth for every divisional region of a screen, according to a captured scene and/or a time period during which an image is captured. In other words, it is possible to reduce a workload of an installer of the monitoring camera, and/or a workload of an observer watching the captured image.

Further, according to the first embodiment example described above, the value of the change determination threshold Cth is altered based on the information on the change in the change amount in the time direction. The value of the variable K indicating the information on the change in the change amount in the time direction gradually decreases according to the value of the constant parameter α to be multiplied, in a region where the change in the time direction is small. For this reason, such a region is not determined as a changed region. Therefore, the value of the variable K after increasing with increase in the change amount decreases according to the value of the constant parameter, even when the change amount with respect to the image of the past frame has been increased by the occurrence of noise, etc. In other words, the value of the change determination threshold Cth is not altered by the occurrence of noise. When the value of the change determination threshold Cth has been altered by the generation of noise, detection of the changed region may be omitted due to the influence thereof in some cases. However, according to the present embodiment example, such omission of detection does not occur.

2. Second Embodiment Example

Summary of Changed-Region Determination Processing

In the first embodiment example described above, false detection of obstructive behavior is reduced by changing the value of the change determination threshold Cth based on the information indicating the tendency of the change between the change amount T currently calculated and the change amount T calculated in the past. In the present embodiment example, false determination of obstructive behavior due to the influence of a moving body is reduced by calculating the change amount T at least twice at different times, to make the lengths of past periods to be referred vary between the calculations performed twice. The image processing device 21 in the present embodiment example also has configurations similar to those illustrated in FIG. 1 to FIG. 3.

Figure 15:
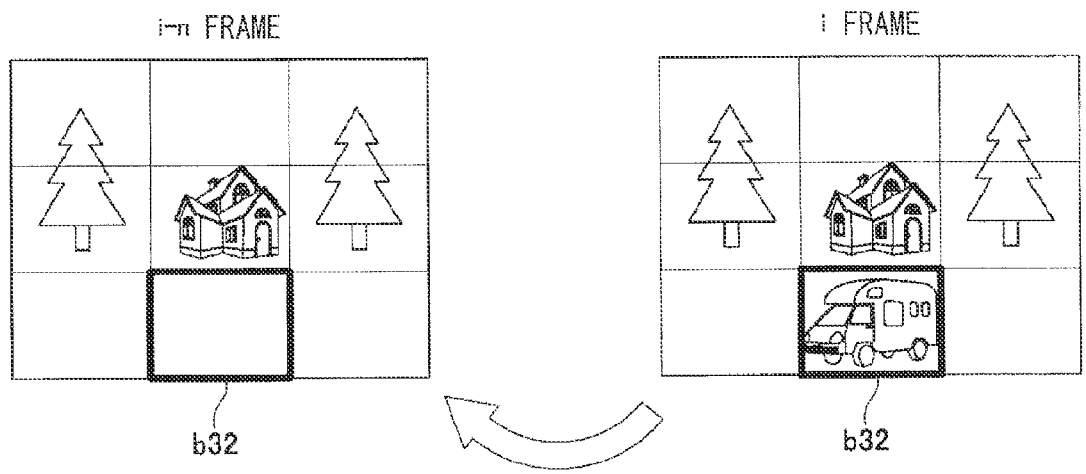
FIG. 15 is a diagram illustrating examples of captured images in a case in which a region is stored as a temporary changed region, according to a second embodiment example of the present disclosure.

FIG. 15 is a diagram illustrating examples of images in the first comparison (in first comparison processing). Illustrated in a right part of FIG. 15 is an image of an i frame which is the current frame, and illustrated in a left part of FIG. 15 is an image of an i-n frame. For simple description, the examples each having a screen divided into nine, i.e. 3×3=9, are illustrated in FIG. 15.

In the current i frame illustrated in the right part of FIG. 15, a car is included in a divisional region b32 located in the middle of the lowermost row, among the divisional regions forming the screen. On the other hand, in the image of the i-n frame illustrated in the left part of FIG. 15 and preceding by an n-number of frames (a first period), nothing is included in the divisional region b32. In this case, the change amount T between the image of the divisional region b32 of the i frame and the image of the divisional region b32 of the i-n frame is a large value. In the present embodiment example, this divisional region b32 is stored as a "temporary changed region" at this point in time.

Figure 16:
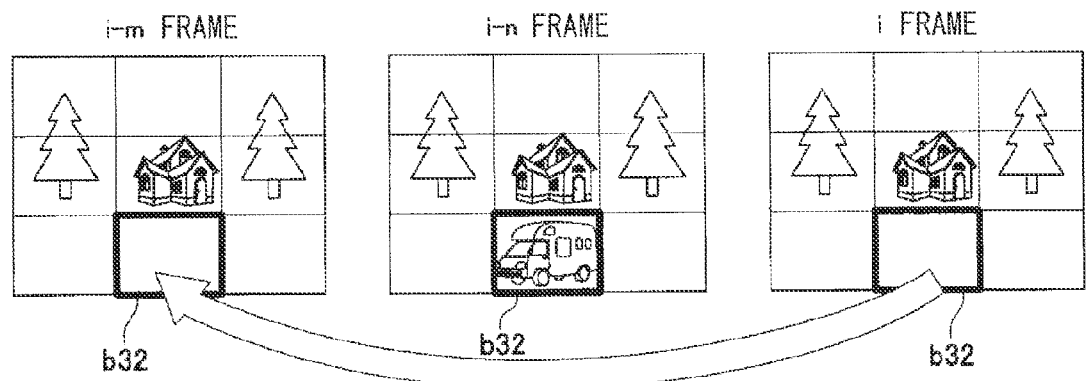
FIG. 16 is a diagram illustrating examples of captured images in a case in which setting of the temporary changed region is cancelled, according to the second embodiment example of the present disclosure.

FIG. 16 illustrates a comparison example between images, after elapse of time corresponding to the n-number of frame (a second period) from the time of capturing of the image illustrated in the right part of FIG. 15. Of FIG. 16, a rightmost part illustrates the image of the current i frame, a central part illustrates the image of the i-n frame, and a leftmost part illustrates the image of an i-m frame. Here, "m" may include, for example, a value larger than "n", such as "2n". Preferably, "m" may be a multiple of "n", but a value that is not a multiple may be set. In the present embodiment example, "m" is assumed to be 2n.

The current i frame illustrated in the rightmost part of FIG. 16 is a frame after the elapse of the time corresponding to the n-number of frames from the i frame in the right part of FIG. 15. Therefore, the image of the i frame illustrated in the right part of FIG. 15 is referred to as the image of the i-n frame in the central part in FIG. 16. Similarly, the image of the i-n frame illustrated in the left part of FIG. 15 is referred to as the image of the i-m frame in the leftmost part in FIG. 16.

In the second comparison (second comparison processing) illustrated in FIG. 16, the image of the i frame and the image of the i-m frame are compared to each other. In other words, instead of the comparison between the image of the n frame one cycle earlier and the image of the current i frame, the comparison between the image two cycles earlier (in a third period) by the m (=2n) frame and the image of the current i frame is performed. The example illustrated in FIG. 16 indicates that the image of the divisional region b32 in the current i frame in the rightmost part and the image of the divisional region b32 in the i-m frame in the leftmost part are substantially the same. For this reason, the value of the change amount T calculated as a result of the second comparison is a considerably small value.

When the value of the change amount T obtained as the result of the second comparison is thus small, the previous setting of the "temporary changed region" is canceled.

By performing such processing, in a case in which the car has passed in the region selected as the update region as illustrated in FIG. 15 and FIG. 16, the region (the divisional region b32) where the car has been detected is not determined as a changed region.

On the other hand, when there is obstructive behavior such as spraying on a lens of the image pickup section, and covering the lens with something such as a cloth, it is conceivable that the result of the first comparison illustrated in FIG. 15 and that of the second comparison illustrated in FIG. 16 may be the same. This is because, for example, in a case in which such obstructive behavior has occurred in the frame illustrated in the right part of FIG. 15, the same phenomenon may be assumed to continue even in a frame the n-number of frames later than that.

In the first comparison, the image of the current i frame in which obstructive behavior has occurred and the image of the i-n frame before the occurrence of the obstructive behavior are compared to each other, and therefore, the calculated change amount T is a large value. The second comparison is performed on a frame n-number of frames later than that, and the image of the current i frame at this point in time is an image in which the influence of the obstructive behavior continues. On the other hand, the image of the i-m frame is the same as the image of the i-n frame referred to in the first comparison, and the obstructive behavior has not yet occurred in this image. Therefore, the value of the calculated change amount T as a result of the second comparison is also a large value.

When a large value of the change amount T is thus calculated both as a result of the first comparison and as a result of the second comparison, the divisional region b32 used to perform the comparisons is stored as a "changed region". Therefore, the region where the moving body such as a car is captured is not stored as a changed region, and only the region where the obstructive behavior has occurred is stored as a changed region. In other words, according to the present embodiment example, it is possible to reduce false detection of obstructive behavior.

Whether or not the calculated change amount T is a large value is determined by a comparison with the change determination threshold Cth set beforehand. The value of the change determination threshold Cth may be set to the same value as the value in the first embodiment example, or may be set to a different value. However, when the first embodiment example and the second embodiment example are performed in combination, it is necessary to determine whether or not the update region is a changed region, by taking into consideration the results of the respective determinations performed using the respective change determination thresholds Cth. For example, it may be necessary to determine whether or not the update region is a changed region, using a result of ANDing or ORing the two determination results. In addition, the same values of the change determination thresholds Cth may be used in the first comparison and the second comparison, or different values may be set respectively.

[Details of Obstructive Behavior Detection Processing]

Figure 17:
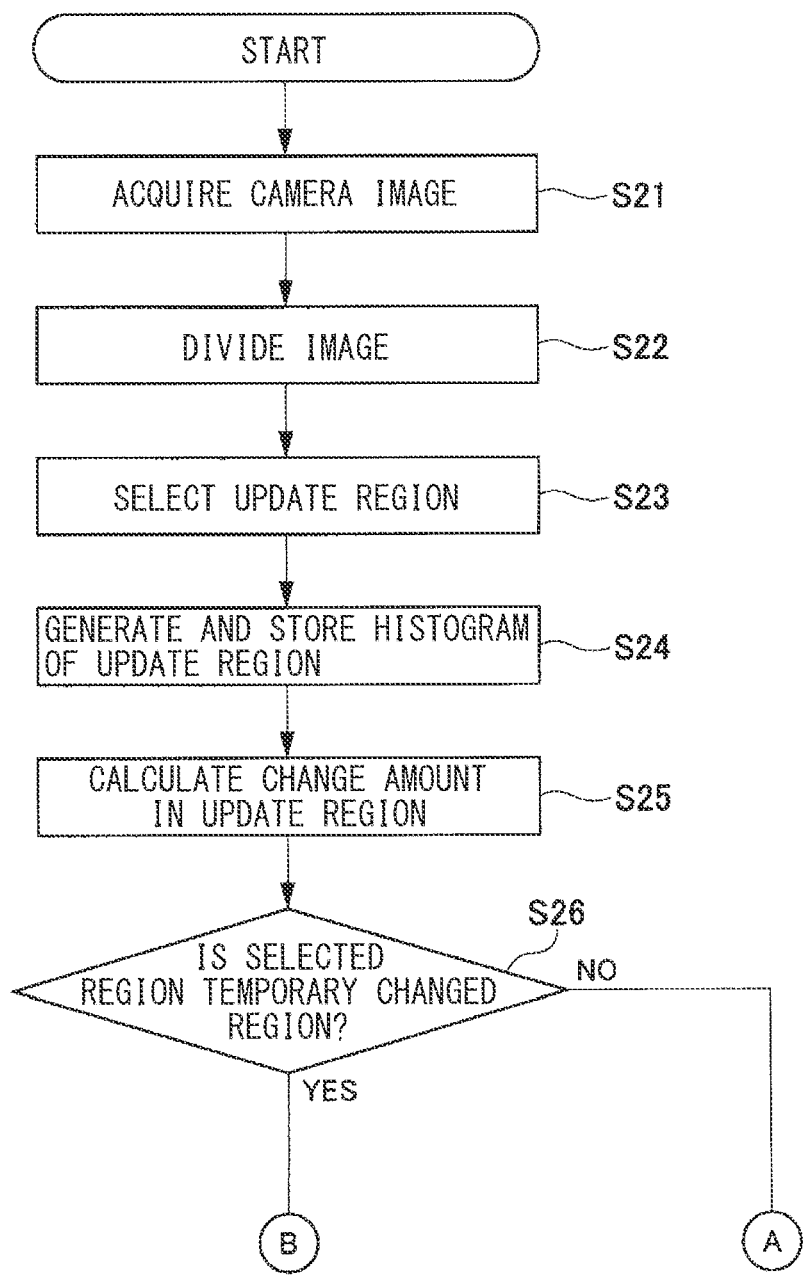
FIG. 17 is a flowchart indicating an example of obstruction determination processing according to the second embodiment example of the present disclosure.

FIG. 17 is a flowchart indicating an example of obstructive behavior detection processing performed by the image processing device 21 of the present embodiment example. First, the acquisition section 31 (see FIG. 1) acquires a camera image (step S21). Next, the image dividing section 63 (see FIG. 3) divides the image data into the N-number of divisional regions (step S22), and the update-region selection section 61 (see FIG. 3) selects a predetermined divisional region as an update region (step S23).

Next, the histogram generation section 64 generates a histogram of the update region, and the generated histogram is stored in the histogram storage section 62 (step S24). Subsequently, a change amount in the update region is calculated by the change determination section 65, which is performed as second processing (step S25). In other words, the change amount T between the image of the update region of the current frame and the image of the update region of the past frame, is calculated. For example, the change amount T between the image of the current i frame and the image of the past i–n frame may be calculated.

After the calculation of the change amount T, the change determination section 65 also determines whether or not the update region is a region stored as a temporary changed region (step S26). When the update region is a region stored not as a temporary changed region, the flow proceeds to a connector A. When the update region is a region stored as a temporary changed region, the flow proceeds to a connector B.

Figure 18:
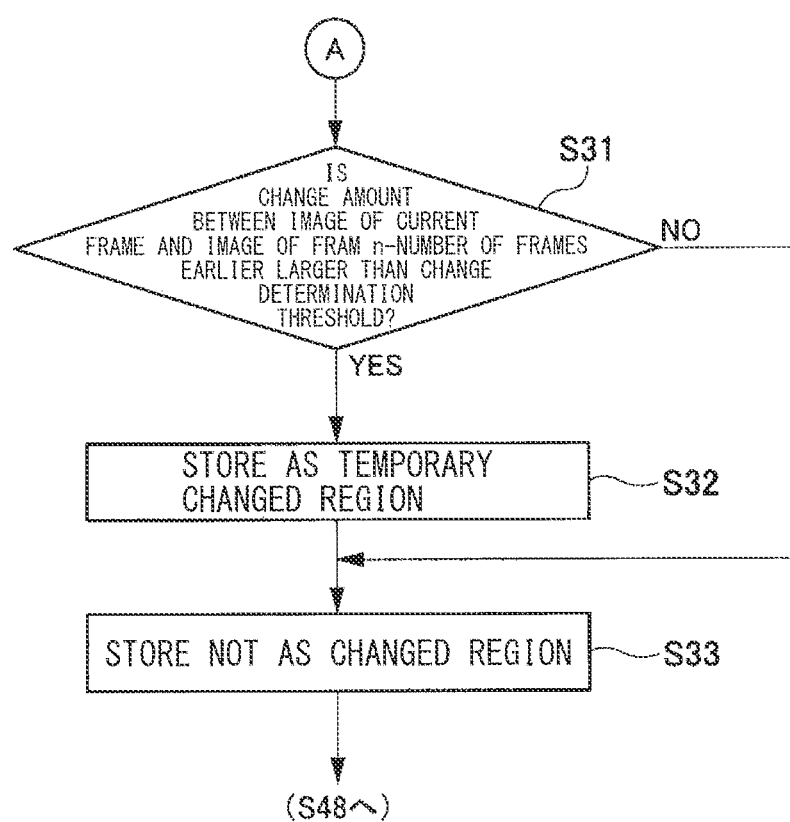
FIG. 18 is a flowchart indicating an example of processing when an update region is a region stored not as the temporary changed region, according to the second embodiment example of the present disclosure.

FIG. 18 is a flowchart indicating processing following the connector A. When the update region is a region stored not as a temporary changed region, the change determination section 65 determines whether or not the change amount T between the image of the current frame and the image the n-number of frames earlier is larger than the change determination threshold Cth (step S31). In other words, here, the "first comparison", which is the first processing of determining whether or not the update region is a temporary changed region, is performed.

As a result of the determination in step S31, when the change amount T is larger than the change determination threshold Cth, the update region is stored as a temporary changed region (step S32). This update region is also stored not as a changed region (step S33). At this stage in which the update region is determined as the temporary changed region, the change may have occurred due to the influence of a moving body, and therefore, it is difficult to determine whether or not the update region is a changed region. Hence, in step S33, the update region is stored not as a changed region.

As a result of determination in step S31, when the change amount T is equal to or smaller than the change determination threshold Cth, the update region is stored not as a changed region (step S33). Subsequent to step S33, the flow proceeds to step S48 in processing following the connector B illustrated in FIG. 19.

Figure 19:
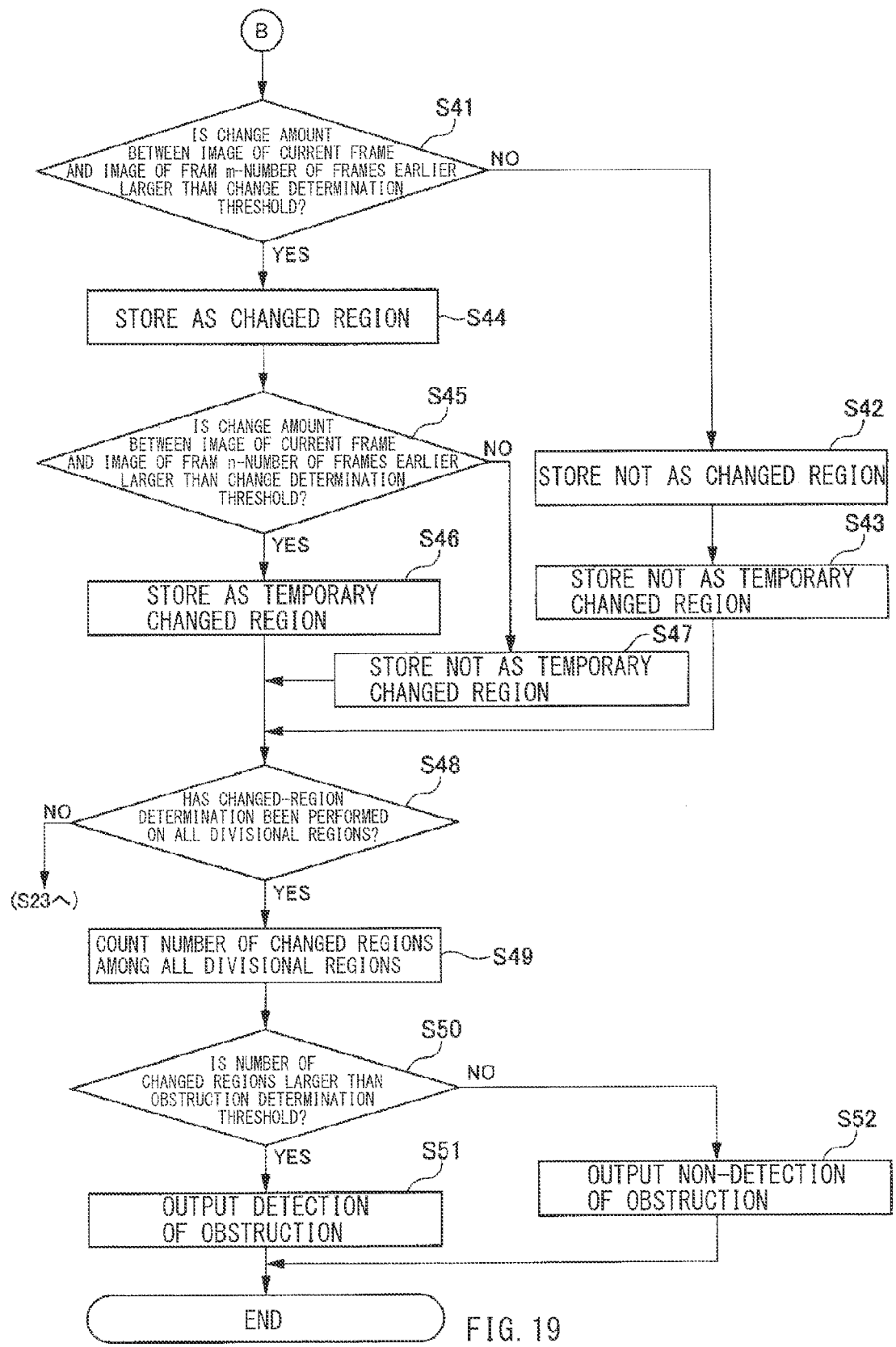
FIG. 19 is a flowchart indicating an example of processing when the update region is a region stored as the temporary changed region, according to the second embodiment example of the present disclosure.

FIG. 19 is a flowchart indicating processing following the connector B. When the update region is a region stored as a temporary changed region, the change determination section 65 determines whether or not the change amount T between the image of the current frame and the image m-number of frames earlier is larger than the change determination threshold Cth (step S41). The fact that the update region is a region stored as a temporary changed region means that the first comparison has already been performed. Therefore, here, the "second comparison", which is the second comparison processing described with reference to FIG. 16, is performed.

When the change amount T is equal to or smaller than the change determination threshold Cth, the update region is stored not as a changed region (step S42).

For example, in the example illustrated in FIG. 16, the divisional region b32, which is an update region, is a region stored as a temporary changed region, as a result of the first comparison illustrated in FIG. 15. In other words, this is a region where the change amount T between the image of the i frame that is the current frame at that time and the image of the i–n frame is large. In contrast, at the point in time illustrated in FIG. 16, after the time corresponding to the n-number of frames has passed since the comparison in FIG. 15, there is almost no change between the current i frame illustrated at the right end of FIG. 16, and the i–m frame two cycles earlier, illustrated at the left end of FIG. 16. For this reason, in the second comparison performed at this stage, the change amount T between the image of the current i frame and the image of the past i–m frame is 0 or a considerably small value.

This makes it possible to determine that the moving body detected based on the level of the change amount T at the time of the first comparison has already passed and gone at the time of the i frame used in the second comparison illustrated in FIG. 16. In this case, it is conceivable that the change based on which the change amount T is calculated has occurred due to the influence of the moving body. Therefore, as indicated in step S42, the update region is stored not as a changed region.

Further, in next step S43, the update region is stored not as a temporary changed region. This update region is a region after the passage of the moving body, and therefore, is a region inappropriate for being stored as the "temporary changed region" that becomes information to be used to determine whether or not the update region is a changed region. Therefore, by storing such an update region "not as a temporary changed region", determination of whether or not this is a temporary changed region is prevented from being performed on this update region.

When it is determined that the change amount T is larger than the change determination threshold Cth in step S41, the update region is stored as a changed region (step S44). When the change amount T is also large in the second comparison following the first comparison, it is possible to determine that the change detected based on the level of the change amount T in the first comparison continues in the second comparison. In other words, it is possible to determine that obstructive behavior has occurred. For this reason, the update region is stored as a changed region.

Subsequently, for the time when the divisional region selected as the update region is next selected again as the update region, it is determined whether or not the divisional region is a temporary changed region (step S45). In other words, it is determined whether or not the change amount T between the image of the current frame and the image n-number of frames earlier is larger than the change determination threshold Cth.

When the change amount T is larger than the change determination threshold Cth, the update region is stored as a temporary changed region (step S46). When the change amount T is equal to or smaller than the change determination threshold Cth, the update region is stored not as a temporary changed region (step S47).

Next, it is determined whether or not the changed-region determination processing has been performed in all the divisional regions forming the captured image (step S48). When there is still a divisional region for which the changed-region determination processing has not been performed, the processing continues by returning to step S23 of FIG. 17.

When it is determined that the changed-region determination processing in all the divisional regions has completed, the counter section 67 counts the number of divisional regions determined as the changed regions targeting all the divisional regions (step S49).

Subsequently, the threshold determination section 68 determines whether or not the number of divisional regions counted as the changed regions is larger than the obstruction determination threshold Oth (step S50). When the number of divisional regions counted as the changed regions is larger than the obstruction determination threshold Oth, such a determination result that obstructive behavior has been detected is outputted (step S51), and the processing ends. When the number of divisional regions counted as the changed regions is equal to or smaller than the obstruction determination threshold Oth, such a determination result that obstructive behavior has not been detected is outputted (step S52), and the processing ends.

In the second embodiment example described above, determination of the level of a change from the image of the past frame is performed twice at different times in the same update region. Further, in the determinations performed twice, the time lengths to trace back are made to vary. In other words, first, the level of a change between the image of the current frame and the immediately preceding image n-number of frames earlier is detected, and then, after the elapse of the time corresponding to the n-number of frames, the level of a change between the image of the current frame and the image m-number of frames earlier, which precedes the n frame, is detected.

As a result, when a subject included in a captured image is a moving body, the result of the first comparison and the result of the second comparison are different. When the results of the two comparisons are different, the update region is stored not as a changed region, thereby reducing false detection of obstructive behavior due to inclusion of the moving body.

It is to be noted that, also in the second embodiment example described above, as with the first embodiment example, the change determination threshold Cth and/or the obstruction determination threshold Oth may be altered based on the level of the change amount T. This makes it possible to obtain the same effects as those obtained in the first embodiment example.

In addition, in the second embodiment example described above, the example in which the detection of a change between images in one update region is performed twice at different times has been described, but the second embodiment example is not limited thereto. The detection may be performed three times or more, and using determination results thereof, determination of whether or not the update region is a changed region may be performed.

3. Third Embodiment Example

Summary of Changed-Region Determination Processing

In the first embodiment example and the second embodiment example described above, false detection of obstructive behavior by the influence of a moving body is reduced. The present embodiment example improves precision of detecting obstructive behavior when a similarity degree between images before and after obstructive behavior is high.

Figure 20:
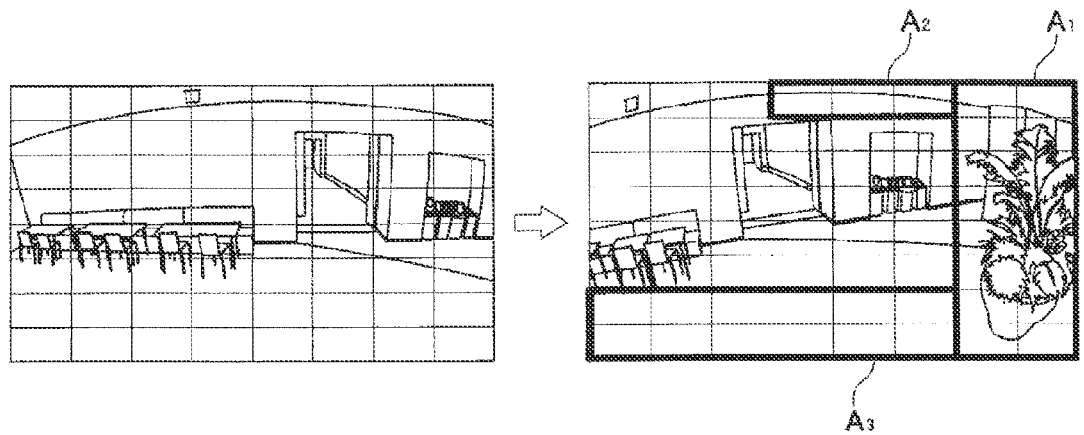
FIG. 20 is a diagram illustrating examples of captured images before and after occurrence of obstructive behavior, according to a third embodiment example of the present disclosure.

FIG. 20 is a diagram illustrating a captured image before occurrence of obstructive behavior and a captured image after the occurrence of the obstructive behavior. The captured image before the occurrence of the obstructive behavior is illustrated in a left part, and the captured image after the occurrence of the obstructive behavior is illustrated in a right part. In the captured image before the occurrence of the obstruction illustrated in the left part of FIG. 20, chairs and desks are included in a left part of a screen, while an entrance and a garbage area are included in a right part of the screen.

In the captured image after the occurrence of the obstructive behavior illustrated in the right part of FIG. 20, a pot plant is included at a right end of the screen, in addition to things included in the captured image in the left part of FIG. 20. It is conceivable that a change has occurred in subjects included in the captured image, because the direction of the image pickup section is changed to an obliquely upward direction by someone.

In this case, in a region A1 including the pot plant at the right end of the screen, the change amount T with respect to the image in the left part of FIG. 20 is large. However, in a region A2 close to a ceiling and a region A3 in a part of a floor, there is almost no change between the image before the occurrence of the obstructive behavior illustrated in the left part of FIG. 20, and the image after the occurrence of the obstructive behavior illustrated in the right part of FIG. 20. Therefore, the calculated change amount T is also a considerably small value, and it is conceivable that a divisional region is not determined as a changed region. When divisional regions, in which there is almost no change between the images before and after the occurrence of the obstructive behavior as described above, occupy a wide range on the screen, the number of divisional regions determined not as changed regions is considerably large. In this case, it may be falsely determined that obstructive behavior has not occurred, although the obstructive behavior has actually occurred.

In the present embodiment example, for a region where obstructive behavior is not easily detected such as the region A2 and the region A3 illustrated in the right part of FIG. 20, the determination of the region as a changed region is made easier by reducing the value of the change determination threshold Cth. Based on the amount of similarity in terms of image between the update region and peripheral divisional regions thereof, it is determined whether or not the update region to be used for the calculation of the change amount T is a region where obstruction is not easily detected.

Figure 21:
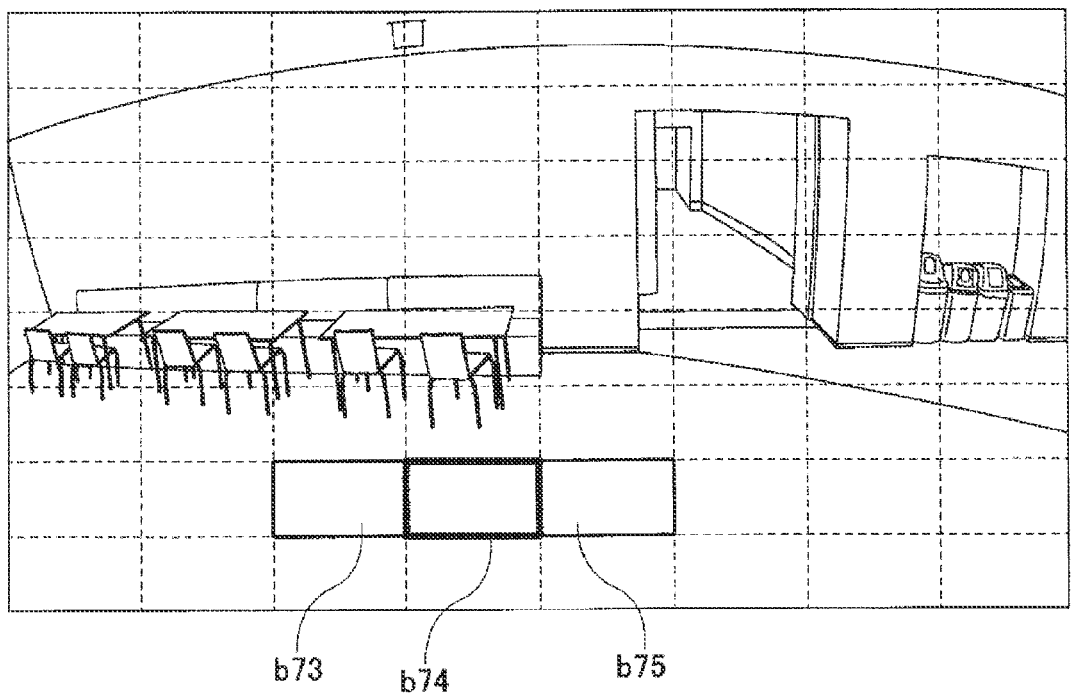
FIG. 21 is a diagram illustrating an example including an update region and peripheral regions thereof, according to the third embodiment example of the present disclosure.

FIG. 21 is a diagram illustrating an example of selection of an update region and peripheral divisional regions. FIG. 21 illustrates an example in which a divisional region b74 is an update region, and each of a divisional region b73 located immediately on the left thereof and a divisional region b75 located immediately on the right thereof is a peripheral region to be used for the calculation of the amount of similarity. The amount of similarity is calculated by determining the amount of agreement by overlapping histograms, in a manner similar to that in each of the embodiment examples described above. In other words, the value D of Expression (1) described above is determined.

The amount of similarity in terms of image between the update region and the peripheral region is calculated using the histogram of the update region generated n-number of frames earlier, and the histogram of the peripheral region generated m-number of frames (for example, an n−1 frame, or an n+1 frame) earlier. In the current frame, there is a possibility that obstructive behavior has already occurred. Therefore, the histogram generated n-number of frames earlier is used as the histogram in the update region to be used to calculate the amount of similarity.

Further, in the present embodiment example, as described with reference to FIG. 5 in the first embodiment example, the selected position of the update region is moved from a peripheral side to an inner side of a screen region, to generate the histogram in the selected update region sequentially. For this reason, for example, the histogram in the divisional region b75 on the right of the update region b74 illustrated in FIG. 21 may not be generated yet at the timing when the update region b74 is selected. Therefore, as the histogram of the divisional region of the peripheral region, the histogram generated m-number of frames before the generation of the histogram of the update region is used.

However, when, for example, the histograms of all regions forming a screen are generated frame by frame beforehand, and the amount of similarity is calculated using these generated histograms, the histograms generated in the same frame may be used as the histogram of the update region and the histogram of the peripheral region. For example, the amount of similarity may be calculated using the histogram of the update region generated n-number of frames earlier and the histogram of the peripheral region generated n-number of frames earlier likewise.

In the example illustrated in FIG. 21, there are two peripheral regions (the divisional region b73 and the divisional region b75) to be used to perform the comparison, and therefore, the amount of similarity is calculated for each of the two regions. Then, it is determined whether or not a value, which is obtained by summing the amounts of similarity calculated for the respective two regions, is larger than a predetermined similarity-degree determination threshold Sth. When the sum of the amounts of similarity is larger than the similarity-degree determination threshold Sth, the value of the change determination threshold Cth is altered to a smaller value. In other words, in the present embodiment example, the change determination threshold Cth is altered based on the level of the similarity degree in terms of image between the update region and the peripheral region adjacent to the update region in a two-dimensional coordinate direction.

Even when a change detected for the image of the past frame is small, the update region thereof is determined as a changed region, by reducing the value of the change determination threshold Cth. In other words, the update region thereof is more-easily determined as a changed region.

When the position of the update region is the left end or the right end of the screen, only either one of the region located immediately on the right and the region located immediately on the left is allowed to be selected as the peripheral region to be used for the calculation of the amount of similarity. In other words, it is difficult to set the number of peripheral regions to be selected, to a number equal to that of divisional regions at other positions. In this case, the similarity-degree determination threshold Sth is assumed to be different from those for other divisional regions.

Alternatively, assuming that the divisional regions located adjacent to each other in the horizontal direction have close amounts of similarity, the amount of similarity calculated as a comparison result may be doubled or multiplied by a constant. In this case, it is also possible to use the same threshold as the similarity-degree determination threshold Sth used in the divisional regions other than those at the right end and the left end of the screen. Further, even if the amount of similarity is doubled or multiplied by a constant, it is possible to use the similarity-degree determination threshold Sth different from the similarity-degree determination threshold Sth used in the divisional regions other than those at the right end and the left end of the screen.

Further, assuming that the degree of similarity between a region outside the captured image and the divisional regions at the right end and the left end of the screen is low, the value of the change determination threshold Cth applied to the divisional regions at the left end and the right end of the screen may remain unaltered.

The position of the divisional region to be selected as the peripheral region is not limited to that in a lateral direction, and one at a position in an up-down direction may be selected. Alternatively, the divisional regions located immediately above, below, left, and right may be all selected as the peripheral regions. Not just the divisional regions located immediately above, below, left, and right, but a divisional region adjacent in an oblique direction may also be selected.

Further, the position of the divisional region to be selected as the peripheral region may be determined depending on a direction in which the image pickup section is movable. For example, when the image pickup section is movable only in a horizontal direction, only divisional regions located immediately left and right in the horizontal direction may be selected. When the image pickup section is movable only in a vertical direction, only divisional regions located immediately above and below in the vertical direction may be selected.

In the description provided so far, the case in which the value of the similarity-degree determination threshold Sth is a fixed value has been taken as an example, but the present disclosure is not limited thereto. A plurality of similarity-degree determination thresholds Sth having different values may be set. This makes it possible to provide a value in accordance with the level of the similarity-degree determination threshold Sth, as the change determination threshold Cth. In addition, the value of the change determination threshold Cth may also be set to a value proportional to the value of the amount of similarity (the value D), instead of being changed by the unit of a predetermined amount.

[Example of Obstructive Behavior Detection Processing]

Figure 22:
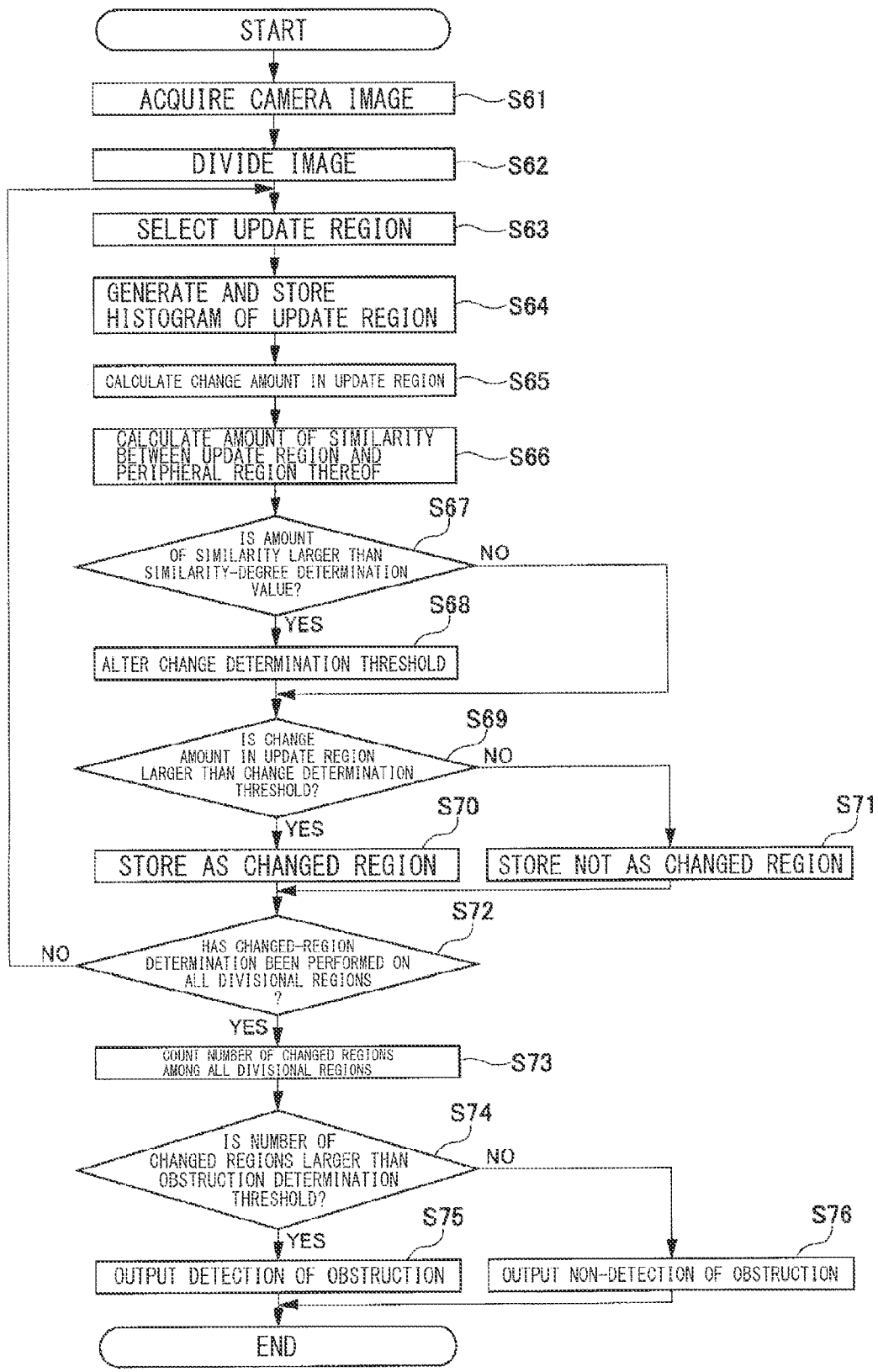
FIG. 22 is a flowchart indicating an example of obstruction determination processing according to the third embodiment example of the present disclosure.

Next, an example of obstructive behavior detection processing performed by the image processing device 21 of the present embodiment example will be described with reference to a flowchart of FIG. 22.

First, the acquisition section 31 (see FIG. 1) acquires a camera image (step S61). Next, the image dividing section 63 (see FIG. 3) divides the image data into the N-number of divisional regions (step S62), and the update-region selection section 61 (see FIG. 3) selects a predetermined divisional region as an update region (step S63).

Next, the histogram generation section 64 generates a histogram of the update region, and the generated histogram is stored in the histogram storage section 62 (step S64). Subsequently, a change amount in the update region is calculated by the change determination section 65, which is performed as second processing (step S65). In other words, the change amount T between the image of the update region of the current frame and the image of the update region of the past frame is calculated. For example, the change amount T between the image of the current i frame and the image of the past i−n frame may be calculated.

The change determination section 65 also performs, as first processing, calculation of the amount of similarity between the update region and the peripheral region thereof (step S66). Here, the update region in the past i–n frame and the peripheral region in the past i–m frame before the past i–n frame are compared to each other. Further, it is determined whether or not the amount of similarity between the update region and the peripheral region thereof is larger than the similarity-degree determination threshold Sth (step S67). When the amount of similarity between the update region and the peripheral region is larger than the similarity-degree determination threshold Sth, the change determination threshold Cth is altered (step S68). When it is determined that the amount of similarity between the update region and the peripheral region thereof is equal to or smaller than the similarity-degree determination threshold Sth, the flow proceeds to step S69.

In step S69, the change determination section 65 also determines whether or not the change amount T between the image of the current i frame and the image of the i–n frame is larger than the change determination threshold Cth. When the change amount T is equal to or smaller than the change determination threshold Cth, the update region is stored as a changed region (step S70). When the change amount T is larger than the change determination threshold Cth, the update region is stored not as a changed region (step S71).

Subsequently, it is determined whether or not the changed-region determination has been performed on all the divisional regions forming the captured image (step S72). When there is still a divisional region on which the changed-region determination has not been performed, the processing continues by returning to step S63.

When it is determined that the changed-region determination on all the divisional regions is completed, the counter section 67 counts the number of divisional regions determined as the changed regions targeting all the divisional regions (step S73).

The threshold determination section 68 then determines whether or not the number of divisional regions counted as the changed regions is larger than the obstruction determination threshold Oth (step S74). When the number of divisional regions counted as the changed regions is larger than the obstruction determination threshold Oth, a determination result that obstructive behavior has been detected is outputted (step S75), and the processing ends. When the number of divisional regions counted as the changed regions is equal to or smaller than the obstruction determination threshold Oth, a determination result that obstructive behavior has not been detected is outputted (step 76), and the processing ends.

In the third embodiment example described above, when the amount of similarity in terms of image between the update region and the peripheral region thereof is large, the change determination threshold Cth applied to the update region is altered to a value that makes it is easier to detect a change. This allows a change in image caused by obstructive behavior to be detected with great precision, even when regions similar in terms of image are distributed widely within a screen.

In addition, the value of the change determination threshold Cth is automatically altered according to the level of the amount of similarity in terms of image between the update region and the peripheral region thereof. Therefore, an optimum value is set as the value of the change determination threshold Cth, for every divisional region. This allows appropriate detection of obstructive behavior, even in a region where a change easily occurs between images before and after the occurrence of the obstructive behavior, and also even in a region where a change does not easily occur.

Moreover, the value of the change determination threshold Cth set in each divisional region is automatically altered according to the level of the calculated change amount T. Therefore, it is possible to reduce a workload of an installer of the monitoring camera, and/or a workload of an observer watching the captured image.

It is to be noted that the processing described as the third embodiment example is allowed to be performed simultaneously with each processing described above in the first embodiment example and/or the second embodiment example. In other words, for example, when performing the determination of a change based on the information on the change in the time direction, in the amount of similarity calculated in each divisional region, the change determination threshold Cth to be used for the determination may be changed based on the level of the amount of similarity between the update region and the peripheral region adjacent thereto. Further, when the determination of the level of a change from the image of the past frame is performed twice at different times in the same update region, the change determination threshold Cth to be used for the determination may be changed based on the level of the amount of similarity between the update region and the peripheral region adjacent thereto.

4. Various Modifications

It is to be noted that, in each of the embodiment examples described above, there has been used the example in which the number (M) of divisional regions to be selected as the update regions in one frame is a value smaller than the total number (N) of divisions of the screen, but the present disclosure is not limited thereto. Assuming M=N, a histogram of the entire region of the screen may be generated frame by frame.

Further, in each of the embodiment examples described above, there has been used the example in which the change amount T between the image of the current frame and the image of the past frame is determined by comparing the histograms generated from the images of the respective frames, but the present disclosure is not limited thereto. Any other types of information such as luminance information, binarized image, and edge-detection information may be adopted, as long as the information enables determination of the change amount T, i.e. as long as the information indicates a characteristic amount of an image.

The above-described series of processings may be performed by hardware, and may also be performed by software. When the series of processings are performed by software, a program forming the software is installed on a computer from a network, a recording medium, etc. The computer mentioned here may be a computer incorporated in dedicated hardware, or may be, for example, a general-purpose personal computer capable of executing various functions by installing various programs.

The recording medium including such a program is configured of any of various recording media distributed to provide users with programs, separately from a device main body. Examples of the various recording media mentioned here may include a magnetic disk (including a floppy disk), an optical disk (including CD-ROM (Compact Disk-Read Only Memory) and DVD), and a magneto-optical disk (including MD (Mini-Disk)) in each of which a program is recorded. In addition, the recording medium including the above-described program may be not only configured using a recording medium such as semiconductor memory, but may be any of flash ROM, hard disk, and the like that are provided to a user in a state being built in the device main body in advance, and in which a program is recorded.

It is to be noted that, in the present specification, steps describing the program recorded in the recording medium may include, not to mention processings performed in a time series along the order thereof, processings executed in parallel or individually without being necessarily performed in a time series.

Moreover, an embodiment of the present disclosure is not limited to the above-described embodiment examples, and may be variously modified in the scope not deviating from the gist of the present disclosure.

It is possible to achieve at least the following configurations from the above-described example embodiments and the modifications of the disclosure.

(1) An image processing device including:
   an acquisition section configured to acquire image data of a captured image;
   a dividing section configured to divide the acquired image data into a plurality of divisional regions;
   a characteristic-amount calculation section configured to calculate a characteristic amount of the image data in each of the divisional regions;
   a characteristic-amount storage section configured to update the calculated characteristic amount sequentially, and to store the updated characteristic amount sequentially; and
   a change determination section configured to perform first processing and second processing, the first processing being provided to calculate a change amount or an agreement amount between the characteristic amount calculated in an update region that is the divisional region in which the characteristic amount is calculated, and the characteristic amount calculated in the divisional region different from the update region in a time direction and/or a two-dimensional coordinate direction, the second processing being provided to calculate a difference value between the characteristic amount calculated currently in the update region, and the characteristic amount calculated earlier in the update region, and the change determination section being configured to determine, based on processing content of the first processing and processing content of the second processing, whether or not the update region is a changed region where a change from image data acquired earlier in the update region is large.

(2) The image processing device according to (1), wherein the change determination section alters, according to a level of the change mount or the agreement amount calculated in the first processing, a value of a change determination threshold to be used to determine whether or not the update region is the changed region.

(3) The image processing device according to (1) or (2), wherein the change determination section sequentially performs calculation of the change amount as the first processing, and calculates a change tendency characteristic parameter by using the calculated change amount, the change tendency characteristic parameter indicating a tendency of a change from the change amount calculated earlier to the change amount calculated currently, and when a value of the change tendency characteristic parameter exceeds a predetermined level, the change determination section alters, the value of the change determination threshold to a value that makes it more difficult to determine that the update region is the changed region.

(4) The image processing device according to (3), wherein the change tendency characteristic parameter is a value obtained by subjecting the difference value calculated currently and the difference value calculated earlier, to time filter processing.

(5) The image processing device according to any one of (1) to (4), wherein, when a difference value between the characteristic amount in the update region and the characteristic amount in the divisional region adjacent to the update region in the two-dimensional coordinate direction is smaller than a predetermined value, the change determination section alters, the value of the change determination threshold to a value that makes it easier to determine that the update region is the changed region.

(6) The image processing device according to any one of (1) to (5), wherein the change determination section performs first comparison processing as the first processing, and performs second comparison processing, the first comparison processing being provided to calculate a difference value between the characteristic amount calculated in the update region, and the characteristic amount calculated a predetermined first period earlier in the update region, the second comparison processing being provided to calculate, after elapse of a second period from execution of the first comparison processing, a difference value between the characteristic amount calculated in the update region and the characteristic amount calculated a third period earlier in the update region, the third period being longer than the second period, and
   the change determination section determines whether or not the update region is the changed region, based on a result of the first comparison processing and a result of the second comparison processing.

(7) The image processing device according to (6), wherein the change determination section performs the second comparison processing, when the difference value calculated in the first comparison processing exceeds a predetermined level.

(8) The image processing device according to (6) or (7), wherein the change determination section determines that the update region is the changed region, when the difference value calculated in the first comparison processing exceeds the predetermined level, and the difference value calculated in the second comparison processing also exceeds the predetermined level.

(9) An image processing method including:
   acquiring image data of a captured image;
   dividing the acquired image data into a plurality of divisional regions;
   calculating a characteristic amount of the image data in each of the divisional regions;
   performing first processing and second processing, the first processing being provided to calculate a change amount or an agreement amount between the characteristic amount calculated in an update region that is the divisional region in which the characteristic amount is calculated, and the characteristic amount calculated in the divisional region different from the update region in a time direction and/or a two-dimensional coordinate direction, the second processing being provided to calculate a difference value between the characteristic amount calculated currently in the update region, and the characteristic amount calculated earlier in the update region; and
   determining, based on processing content of the first processing and processing content of the second processing, whether or not the update region is a changed region where a change from image data acquired earlier in the update region is large.

(10) A non-transitory tangible recording medium having a program embodied therein, the computer-readable program allowing, when executed by a computer, the computer to implement an image processing method, the image processing method including:

acquiring image data of a captured image;

dividing the acquired image data into a plurality of divisional regions;

calculating a characteristic amount of the image data in each of the divisional regions;

performing first processing and second processing, the first processing being provided to calculate a change amount or an agreement amount between the characteristic amount calculated in an update region that is the divisional region in which the characteristic amount is calculated, and the characteristic amount calculated in the divisional region different from the update region in a time direction and/or a two-dimensional coordinate direction, the second processing being provided to calculate a difference value between the characteristic amount calculated currently in the update region, and the characteristic amount calculated earlier in the update region; and determining, based on processing content of the first processing and processing content of the second processing, whether or not the update region is a changed region where a change from image data acquired earlier in the update region is large.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing device comprising:
at least one processor configured to:
acquire image data of a captured image;
divide the acquired image data into a plurality of divisional regions;
calculate a characteristic amount of the image data in each of the divisional regions;
update the calculated characteristic amount sequentially, and store the updated characteristic amount sequentially; and
perform first processing and second processing, the first processing being provided to calculate a change amount or an agreement amount between the characteristic amount calculated in an update region that is the divisional region in which the characteristic amount is calculated, and the characteristic amount calculated in the divisional region different from the update region in a time direction and/or a two-dimensional coordinate direction, the second processing being provided to calculate a difference value between the characteristic amount calculated currently in the update region, and the characteristic amount calculated earlier in the update region, and the change determination section being configured to determine, based on processing content of the first processing and processing content of the second processing, whether or not the update region is a changed region where a change from image data acquired earlier in the update region is larger than a value of a change determination threshold, wherein the at least one processor is configured to alter, according to a level of the change amount or the agreement amount calculated in the first processing, the value of the change determination threshold to be used to determine whether or not the update region is the changed region.

2. The image processing device according to claim 1, wherein the at least one processor is configured to sequentially perform calculation of the change amount as the first processing, and calculate a change tendency characteristic parameter by using the calculated change amount, the change tendency characteristic parameter indicating a tendency of a change from the change amount calculated earlier to the change amount calculated currently, and when a value of the change tendency characteristic parameter exceeds a predetermined level, the at least one processor is configured to alter, the value of the change determination threshold to a value that makes it more difficult to determine that the update region is the changed region.

3. The image processing device according to claim 2, wherein the change tendency characteristic parameter is a value obtained by subjecting the difference value calculated currently and the difference value calculated earlier, to time filter processing.

4. The image processing device according to claim 1, wherein, when a difference value between the characteristic amount in the update region and the characteristic amount in the divisional region adjacent to the update region in the two-dimensional coordinate direction is smaller than a predetermined value, the at least one processor is configured to alter the value of the change determination threshold to a value that makes it easier to determine that the update region is the changed region.

5. An image processing method comprising:
acquiring image data of a captured image;
dividing the acquired image data into a plurality of divisional regions;
calculating a characteristic amount of the image data in each of the divisional regions;
performing first processing and second processing, the first processing being provided to calculate a change amount or an agreement amount between the characteristic amount calculated in an update region that is the divisional region in which the characteristic amount is calculated, and the characteristic amount calculated in the divisional region different from the update region in a time direction and/or a two-dimensional coordinate direction, the second processing being provided to calculate a difference value between the characteristic amount calculated currently in the update region, and the characteristic amount calculated earlier in the update region;
altering, according to a level of the change amount or the agreement amount calculated in the first processing, a value of a change determination threshold to be used to determine whether or not the update region is a changed region where a change from image data acquired earlier in the update region is larger than the change determination threshold; and
determining, based on processing content of the first processing and processing content of the second processing, whether or not the update region is the changed region.

6. A non-transitory tangible recording medium having a program embodied therein, the program allowing, when executed by a computer, the computer to implement an image processing method, the image processing method comprising:

acquiring image data of a captured image;

dividing the acquired image data into a plurality of divisional regions;

calculating a characteristic amount of the image data in each of the divisional regions;

performing first processing and second processing, the first processing being provided to calculate a change amount or an agreement amount between the characteristic amount calculated in an update region that is the divisional region in which the characteristic amount is calculated, and the characteristic amount calculated in the divisional region different from the update region in a time direction and/or a two-dimensional coordinate direction, the second processing being provided to calculate a difference value between the characteristic amount calculated currently in the update region, and the characteristic amount calculated earlier in the update region;

altering, according to a level of the change amount or the agreement amount calculated in the first processing, a value of a change determination threshold to be used to determine whether or not the update region is a changed region where a change from image data acquired earlier in the update region is larger than the change determination threshold; and determining, based on processing content of the first processing and processing content of the second processing, whether or not the update region is the changed region.

* * * * *